(12) United States Patent
Nagai et al.

(10) Patent No.: US 11,535,130 B2
(45) Date of Patent: Dec. 27, 2022

(54) VEHICLE SEAT

(71) Applicant: Toyota Jidosha Kabushiki Kaisha, Toyota Aichi-ken (JP)

(72) Inventors: Tetsuya Nagai, Okazaki (JP); Kohshi Katoh, Toyota (JP); Takashi Sugimoto, Anjyo (JP); Osamu Oda, Toyota (JP); Masatoshi Hada, Nagakute (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 624 days.

(21) Appl. No.: 16/590,819

(22) Filed: Oct. 2, 2019

(65) Prior Publication Data

US 2020/0108749 A1 Apr. 9, 2020

(30) Foreign Application Priority Data

Oct. 4, 2018 (JP) .............................. JP2018-189364
Sep. 24, 2019 (JP) .............................. JP2019-172440

(51) Int. Cl.
*B60N 2/50* (2006.01)
*B60N 2/66* (2006.01)

(52) U.S. Cl.
CPC ............. *B60N 2/501* (2013.01); *B60N 2/503* (2013.01); *B60N 2/6671* (2015.04)

(58) Field of Classification Search
CPC ........ B60N 2/0244; B60N 2/66; B60N 2/665; B60N 2/667; B60N 2/6673; B60N 2/6671; B60N 2/503; B60N 2/501
See application file for complete search history.

(56) References Cited

U.S. PATENT DOCUMENTS

| 5,129,704 A * | 7/1992 | Kishi ................... B60N 2/0224 297/284.6 |
| 5,455,494 A * | 10/1995 | Ogasawara ............ B60N 2/666 297/DIG. 3 |
| 9,187,020 B2 * | 11/2015 | Meyer ...................... B60N 2/66 |
| 2003/0075959 A1 * | 4/2003 | Xue ...................... B60N 2/6671 297/284.4 |
| 2010/0164270 A1 | 7/2010 | Akutsu |
| 2014/0191550 A1 | 7/2014 | Katoh et al. |
| 2015/0130237 A1 | 5/2015 | Takeuchi et al. |
| 2016/0325641 A1 * | 11/2016 | Ohno ...................... B60N 2/666 |

FOREIGN PATENT DOCUMENTS

| CN | 102065729 A | 5/2011 | |
| CN | 103732441 A | 4/2014 | |
| CN | 103863165 A * | 6/2014 | ........... B60N 2/0244 |

(Continued)

*Primary Examiner* — Milton Nelson, Jr.
(74) *Attorney, Agent, or Firm* — Dinsmore & Shohl LLP

(57) ABSTRACT

A vehicle seat includes a seat cushion configured to support the buttocks of an occupant, a seat back configured to support the back of the occupant, an elastic force adjustment unit configured to adjust elastic force of a lumbar spine support of the seat back configured to support the lumbar spine of the occupant, in a longitudinal direction, and a controller configured to operate the elastic force adjustment unit. The controller is configured to make the elastic force larger in the case where oscillation of the vehicle is large, than that in the case where oscillation of the vehicle is small.

8 Claims, 22 Drawing Sheets

(56) References Cited

FOREIGN PATENT DOCUMENTS

| | | | |
|---|---|---|---|
| CN | 104245419 A | | 12/2014 |
| EP | 0582821 A1 | | 2/1994 |
| EP | 2743122 A1 | | 6/2014 |
| JP | S63034630 U | | 3/1988 |
| JP | 2009-172145 A | | 8/2009 |
| JP | 2009172145 A | * | 8/2009 |
| JP | 2011-502595 A | | 1/2011 |
| JP | 4925176 B2 | | 4/2012 |
| JP | 2017-013637 A | | 1/2017 |
| KR | 10-2018-0106640 A | | 10/2018 |
| WO | 2009/059648 A1 | | 5/2009 |
| WO | 2013/021497 A1 | | 2/2013 |

* cited by examiner

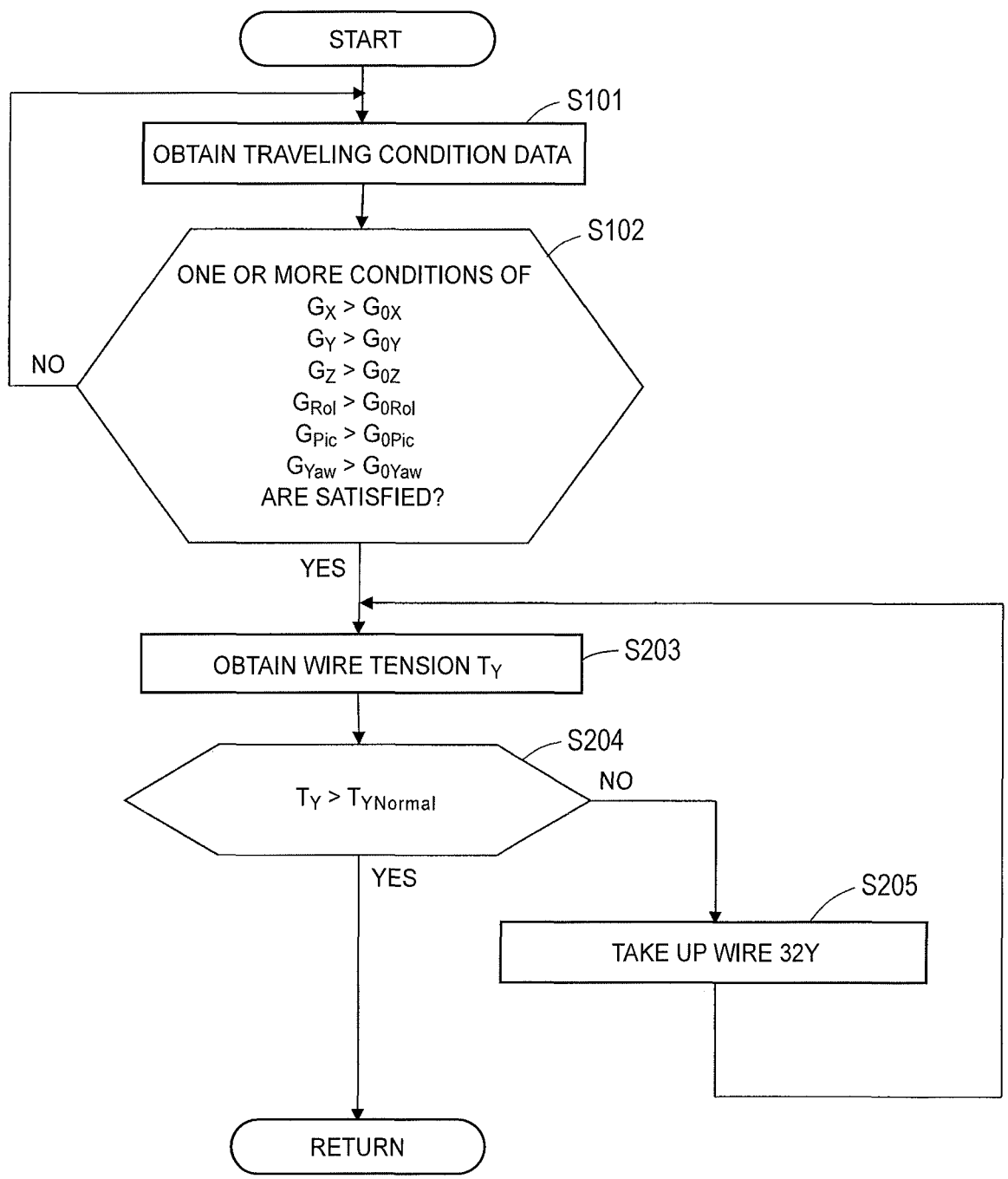

VEHICLE SEAT

CROSS-REFERENCE TO RELATED APPLICATION

This application claims priority to Japanese Patent Application No. 2019-172440 filed on Sep. 24, 2019, incorporated herein by reference in its entirety.

BACKGROUND

1. Technical Field

The disclosure relates to the structure of a vehicle seat.

2. Description of Related Art

When the sitting posture of an occupant on a vehicle seat is not appropriate, the occupant may get deeply tired, for example. Thus, it has been proposed to inflate air bags of a seat back in accordance with the body type of the occupant, and keep the pelvis of the occupant at an appropriate position, so as to appropriately adjust the posture of the occupant and reduce tiredness (see, for example, Japanese Unexamined Patent Application Publication No. 2009-172145 (JP 2009-172145 A)).

It has also been proposed to detect the shape of the lumbar spine of an occupant seated on a vehicle seat, and adjust the position of a lumbar support so that the lumbar spine assumes a curved shape (see, for example, Japanese Unexamined Patent Application Publication No. 2017-13637 (JP 2017-13637 A)).

SUMMARY

The sitting posture of an occupant changes depending on oscillation of the vehicle during traveling, steering action, etc. However, it is difficult for the vehicle seats described in JP 2009-172145 A and JP 2017-13637 A to cope with change of the sitting posture of the occupant due to oscillation of the vehicle, for example.

This disclosure provides a technology for appropriately adjusting the posture of the upper body of an occupant, even when the sitting posture of the occupant changes due to oscillation of a vehicle, for example.

A first aspect of the disclosure is concerned with a vehicle seat. The vehicle seat includes a seat cushion configured to support the buttocks of an occupant, a seat back configured to support the back of the occupant, an elastic force adjustment unit configured to adjust elastic force of a lumbar spine support of the seat back configured to support the lumbar spine of the occupant, in a longitudinal direction, and a controller configured to operate the elastic force adjustment unit. The controller is configured to cause the elastic force adjustment unit to make the elastic force larger in the case where oscillation of a vehicle is large, than that in the case where oscillation of the vehicle is small.

In the first aspect, the elastic force adjustment unit may be configured to adjust the elastic force of only the lumbar spine support in the longitudinal direction. The controller may be configured to cause the elastic force adjustment unit to make the elastic force of only the lumbar spine support larger in the case where oscillation of the vehicle is large, than that in the case where oscillation of the vehicle is small.

According to the first aspect as described above, the elastic force of the seat back in the longitudinal direction is made larger in the case where oscillation of the vehicle is large, than that in the case where oscillation of the vehicle is small. Thus, when oscillation of the vehicle is large, reaction force applied from the seat back to the occupant acts in such a direction as to curb movement of the upper body of the occupant, and oscillation of the head of the occupant can be reduced.

In the first aspect, the elastic force adjustment unit may be configured to make the elastic force of the lumbar spine support larger than those of portions of the seat back other than the lumbar spine support.

With the above arrangement, even when oscillation of the vehicle is large, and the sitting posture of the occupant changes, the posture of the upper body of the occupant can be appropriately adjusted by making a support load of the lumbar spine region of the occupant larger than support loads of the other regions.

In the first aspect, the elastic force adjustment unit may be configured to adjust elastic force of a sacrum support included in the seat back and configured to support the sacrum located below the lumbar spine of the occupant, and elastic force of a thoracic spine support included in the seat back and configured to support the thoracic spine located above the lumbar spine of the occupant, in addition to the elastic force of the lumbar spine support. The elastic force adjustment unit may be configured to make the elastic force of the lumbar spine support larger than the elastic force of each of the sacrum support and the thoracic spine support, when oscillation of the vehicle is large.

With the above arrangement, the elastic force of the sacrum support that supports the sacrum located below the lumbar spine, and that of the thoracic spine support that supports the thoracic spine located above the lumbar spine, in addition to that of the lumbar spine support, are adjusted, so that the elastic force of the lumbar spine support is made larger than those of the thoracic spine support and sacrum support located above and below the lumbar spine support, and the support load of the lumbar spine region of the occupant can be efficiently made larger than the support loads of the other regions. Thus, the posture of the upper body of the occupant can be efficiently and appropriately adjusted, and oscillation of the head of the occupant can be reduced.

In the first aspect, the case where oscillation of the vehicle is large may be at least one case selected from traveling on a bad road, cornering, lane change, and acceleration, and the controller may be configured to make the elastic force of the lumbar spine support larger than those of portions of the seat back other than the lumbar spine support, in at least one case selected from traveling on a bad road, cornering, lane change, and acceleration.

With the above arrangement, in a traveling condition in which the sitting posture of the occupant changes due to oscillation of the vehicle, the posture of the upper body of the occupant can be appropriately adjusted, and oscillation of the head of the occupant can be reduced.

In the first aspect, the elastic force adjustment unit may include a wire extended in a width direction of the seat back, and a tension adjustment mechanism configured to adjust tension of the wire. The elastic force adjustment unit may be configured to change the elastic force by causing the tension adjustment mechanism to adjust the tension of the wire.

With the above arrangement, the elastic force can be adjusted with a simple, lightweight arrangement.

In the first aspect, the seat back may be configured to rotate relative to the seat cushion.

In the first aspect, the vehicle seat may further include a frame that is mounted on the vehicle and supports the seat cushion and the seat back. The seat cushion may be configured to pivot in a roll direction and a yaw direction of the vehicle relative to the frame, and may be configured to support the buttocks and thighbones of the occupant. The seat back may be configured to pivot in the roll direction and the yaw direction of the vehicle relative to the frame, and a pivot center axis of the seat cushion may pass the lumbar spine support of the seat back.

With the above arrangement, the elastic force adjustment unit is combined with the vehicle seat of which the seat cushion and the seat back are supported so as to rock. In the rocking seat, reaction force applied from the seat back to the occupant when the vehicle shakes acts in such a direction as to curb movement of the upper body of the occupant, and oscillation of the head of the occupant can be reduced.

According to the first aspect of the disclosure, the posture of the upper body of the occupant can be appropriately adjusted, even when the sitting posture of the occupant changes due to oscillation of the vehicle, for example.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 22 is a flowchart illustrating operation of the elastic force adjustment unit of the vehicle seat shown in FIG. 21.

DETAILED DESCRIPTION OF EMBODIMENTS

First Embodiment

Structure of Vehicle Seat 10

A vehicle seat 10 of a first embodiment will be described with reference to the drawings. Arrow FR, arrow UP, and arrow RH shown in each of the drawings indicate the front direction (a vehicle traveling direction), upward direction, and right-hand direction, respectively, of the vehicle. The opposite directions of arrows FR, UP, RH are the rear direction, downward direction, and left-hand direction of the vehicle. When the front and rear, right-hand and left-hand, and upward and downward directions are simply used in the description below, they are supposed to indicate the vehicle front-rear direction (or vehicle longitudinal direction), vehicle right-left direction (or vehicle width direction), and vehicle upward-downward direction (or vehicle vertical direction), respectively, unless otherwise specified. In this embodiment, rotation about an axis extending in the vehicle longitudinal direction will be referred to as rotation in a roll direction, and rotation about an axis extending in the vehicle width direction will be referred to as rotation in a pitch direction, while rotation about an axis extending in the vehicle vertical direction will be referred to as rotation in a yaw direction, for the sake of convenience. While the vehicle seat 10 is a driver's seat in this embodiment, the vehicle seat 10 may be used as a vehicle seat, such as a passenger's seat, other than the driver's seat.

Figure 1:
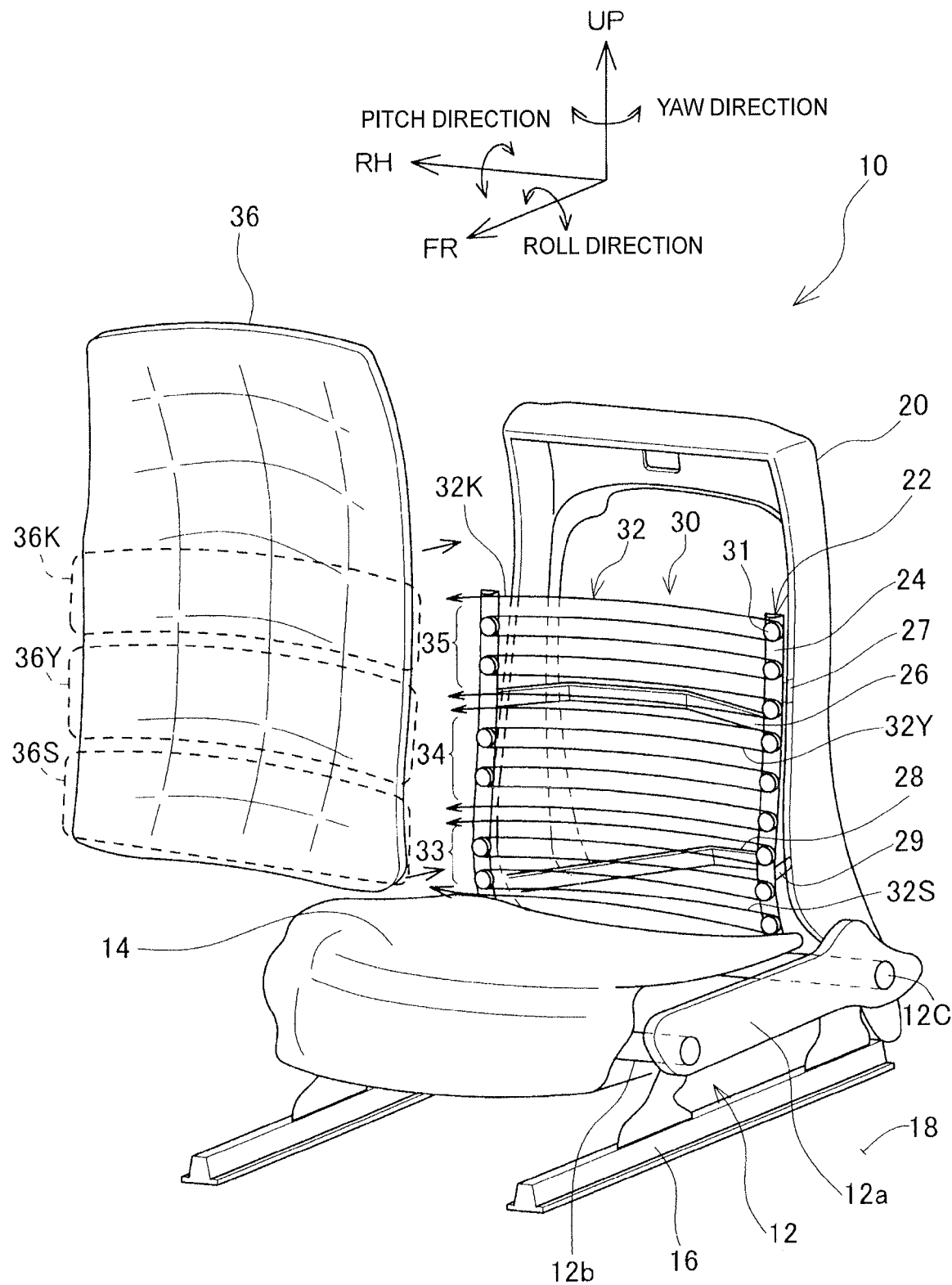
FIG. 1 is an exploded perspective view of a vehicle seat of a first embodiment.
Figure 2:
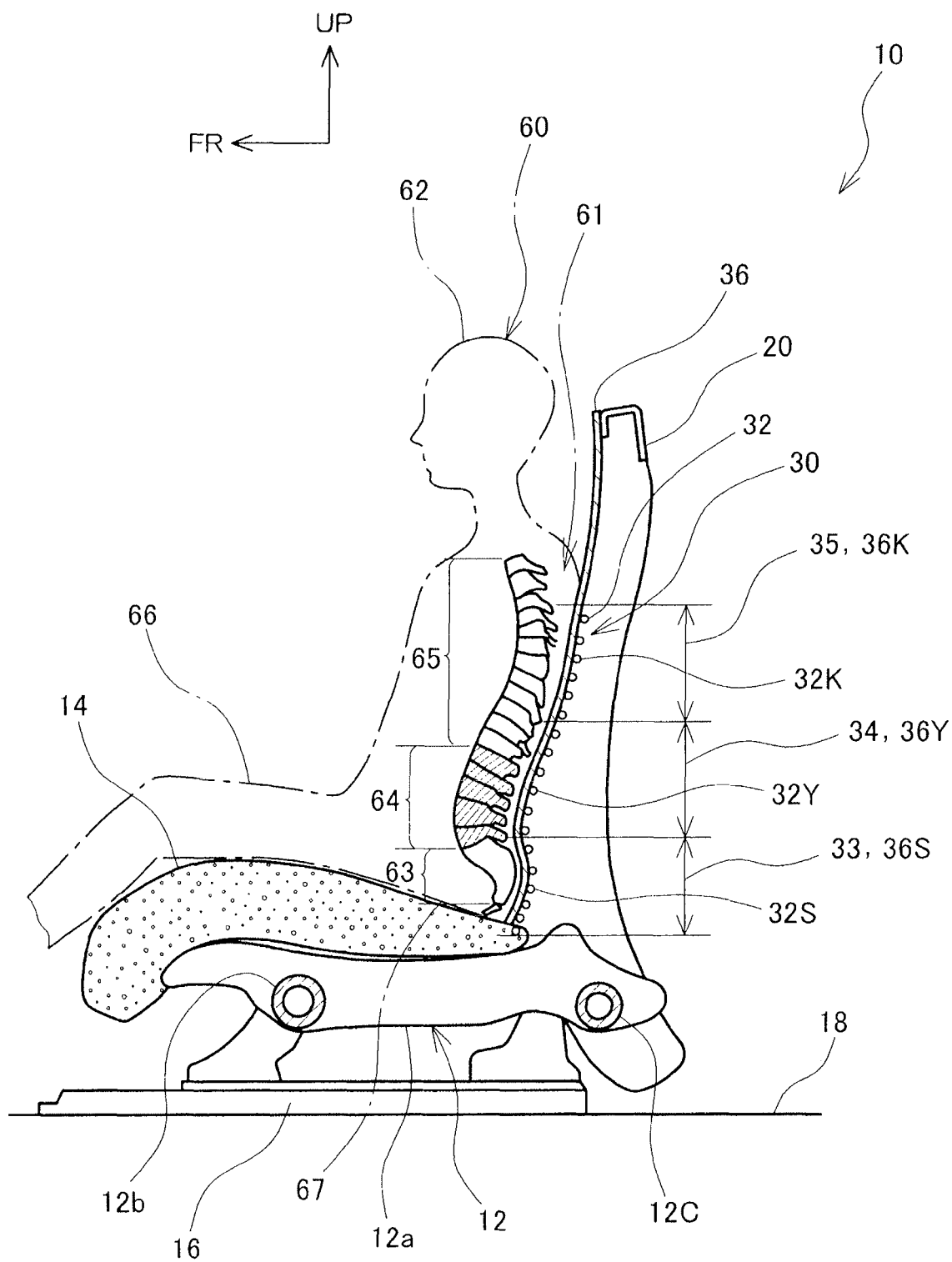
FIG. 2 is a cross-sectional view showing a condition in which an occupant is seated on the vehicle seat shown in FIG. 1.

As shown in FIG. 1 and FIG. 2, the vehicle seat 10 includes a seat cushion frame 12 (which will be called "C frame 12"), seat cushion 14, seat back frame 20 (which will be called "B frame 20"), seat back subsidiary frame 22 (which will be called "S frame 22"), and seat back 36. The vehicle seat 10 has a moving mechanism, such as a reclining mechanism, and the seat back 36 can rotate relative to the seat cushion 14. The seat cushion 14 may rotate relative to the seat back 36, or both the seat back 36 and the seat cushion 14 may rotate relative to each other. The relative rotational movements of the seat back 36 and the seat cushion 14 as described above may not be strictly arc-like movements.

The C frame 12 is a rectangular framework member that consists of side members 12a that are disposed on the right and left sides and extend in the longitudinal direction, and pipes 12b, 12c that connect the side members 12a in the lateral direction, at front and rear portions of the side members 12a. The C frame 12 is mounted to a floor 18 of the vehicle, via slide rails 16.

The seat cushion 14 that supports the buttocks 67 and thighs 66 of an occupant 60 is mounted on the upper side of the C frame 12. Also, the B frame 20 as an inverted U-shaped framework member as seen in a front view is attached at its lower end portions to rear end portions of the C frame 12.

The S frame 22 is mounted to the front side of the B frame 20. The S frame 22 is a framework member that consists of right and left vertical members 24 that extend in the vertical direction, upper lateral member 26 that connects the right and left vertical members 24 at the slightly upper side of the middle of the vertical members 24 in the vertical direction, and lower lateral member 28 that connects the right and left vertical members 24 at the lower ends of the vertical members 24. The vertical members 24 and the upper and lower lateral members 26, 28 form a generally rectangular frame of parallel bars. The S frame 22 is mounted to the front side of the B frame 20, via an upper bracket 27 and a lower bracket 29 provided on the vertical members 24.

The seat back 36 is mounted to the front side of the S frame 22. The seat back 36 is a rectangular bowl-shaped plate member that has substantially the same size as an upper portion of the B frame 20 located above the seat cushion 14, and includes a middle portion that is recessed backward. The seat back 36 is formed from an elastic member made of resin, for example. Right and left end portions of the seat back 36 are mounted to the opposite vertical members 24 of the S frame 22. An upper end portion of the seat back 36 is slidably supported by an upper end portion of the B frame 20.

As shown in FIG. 2, when the occupant 60 is seated on the vehicle seat 10, a load applied backward from a portion of the occupant 60 including the sacrum 63 of the spine, a load applied backward from a portion of the occupant 60 including the lumbar spine 64 (hatched area) located above the sacrum 63, and a load applied backward from a portion of the occupant 60 including the thoracic spine 65 located above the lumbar spine 64 are respectively supported by a sacrum support 36S, lumbar spine support 36Y, and thoracic spine support 36K of the seat back 36.

Configuration of Elastic Force Adjustment Unit

Figure 3:
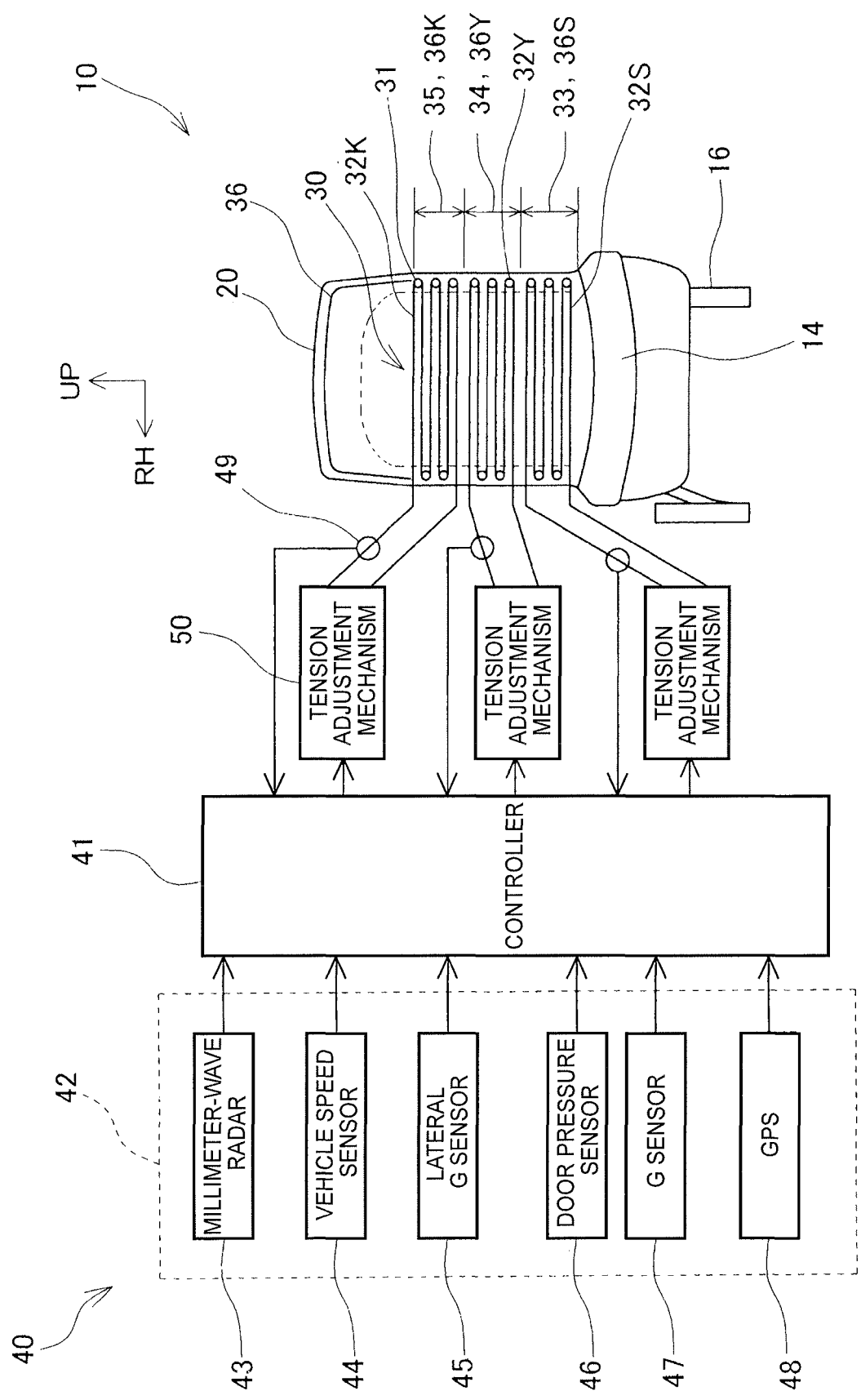
FIG. 3 is a system diagram showing the configuration of an elastic force adjustment unit of the vehicle seat shown in FIG. 1.

Next, an elastic force adjustment unit 40 that adjusts elastic force will be described. As shown in FIG. 3, the elastic force adjustment unit 40 consists of a load receiving wire assembly 30 that consists of a lower section 33, middle section 34, and upper section 35, three tension adjustment mechanisms 50 that adjust tensions of respective wires 32S, 32Y, 32K of the sections 33, 34, 35, three tension sensors 49 that detect the tensions of the respective wires 32S, 32Y, 32K, a traveling condition detecting unit 42 that detects traveling conditions of the vehicle, and a controller 41 that operates the tension adjustment mechanisms 50 based on data received from the respective tension sensors 49 and the traveling condition detecting unit 42. The controller 41 is an example of a controller and the controller 41 is a microcomputer that processes data supplied, and outputs control signals, and a hardware, such as an electronic control unit (ECU), may be employed as the controller 41. The controller 41 and the traveling condition detecting unit 42 may be provided with the inside of the vehicle seat 10, and may be provided with the outside of the vehicle seat 10.

As shown in FIG. 1 and FIG. 2, the load receiving wire assembly 30, which is disposed between the S frame 22 and the seat back 36, has a plurality of lines of wires 32 extended between the vertical members 24 of the S frame 22 in the width direction of the seat back 36.

The load receiving wire assembly 30 consists of three sections, i.e., the lower section 33, middle section 34, and upper section 35 corresponding to the sacrum support 36S, lumbar spine support 36Y, and thoracic spine support 36K of the seat back 36, respectively. Each of these sections 33, 34, 35 is formed by turning a single wire 32S, 32Y, 32K back and forth a plurality of times while looping it around a plurality of pulleys 31 rotatably mounted on the opposite vertical members 24 of the S frame 22, so that a plurality of lines of wires 32S, 32Y, 32K is extended between the vertical members 24. In the vehicle seat 10 of this embodiment, six lines of each wire 32S, 32Y, 32K are extended over a corresponding one of the sections 33, 34, 35.

As shown in FIG. 2, when the occupant 60 is seated on the vehicle seat 10, and a load is applied backward to the seat back 36, the seat back 36 elastically bows backward. Then, the load applied backward from the back 61 of the occupant 60 is transmitted to the respective wires 32S, 32Y, 32K of the lower, middle, and upper sections 33, 34, 35 located backward of the seat back 36, and tensile force is applied to the respective wires 32S, 32Y, 32K. Then, the loads applied to the sacrum support 36S, lumbar spine support 36Y, and thoracic spine support 36K of the seat back 36 are transmitted to the respective wires 32S, 32Y, 32K of the sections 33, 34, 35 corresponding to the sacrum support 36S, lumbar spine support 36Y, and thoracic spine support 36K of the seat back 36, and supported by the tensile forces of the wires 32S, 32Y, 32K.

Accordingly, it is possible to adjust elastic forces of the sacrum support 36S, lumbar spine support 36Y, and thoracic spine support 36K of the seat back 36 supporting the sacrum 63, lumbar spine 64, and thoracic spine 65 of the occupant 60, respectively, by adjusting the tensions of the respective wires 32S, 32Y, 32K of the lower section 33, middle section 34 and upper section 35. The occupant 60 senses the elastic force of each support of the seat back 36, as a seating pressure.

Figure 4A:
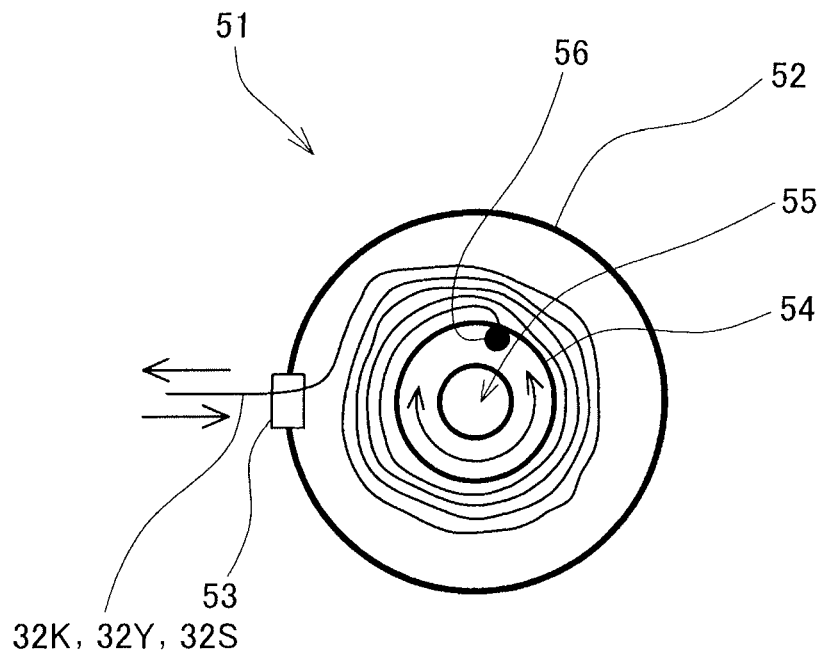
FIG. 4A is a side cross-sectional view of a wire tension adjustment mechanism of the vehicle seat shown in FIG. 1.
Figure 4B:
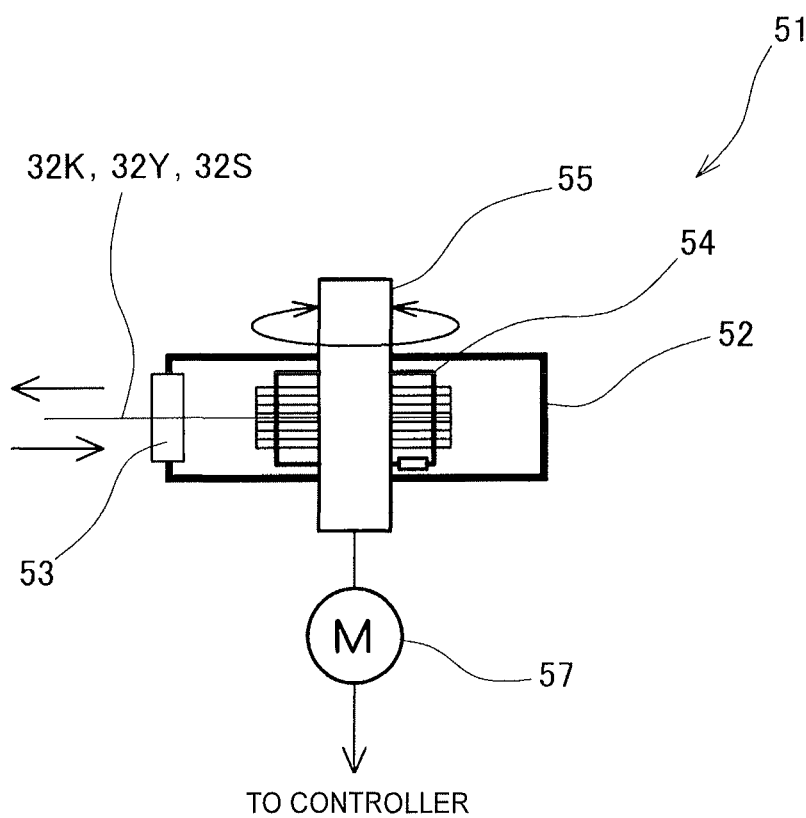
FIG. 4B is a plan cross-sectional view of the wire tension adjustment mechanism of the vehicle seat shown in FIG. 1.

As shown in FIG. 4A and FIG. 4B, each tension adjustment mechanism 50 is provided with a take-up mechanism 51 for taking up each wire 32S, 32Y, 32K. The take-up mechanism 51 consists of a casing 52, a reel 54 around which the wire 32S, 32Y, 32K drawn into the casing 52 through an opening 53 of the casing 52 is wound, and a motor 57 that rotates/drives the reel 54. A rotary shaft 55 attached to the reel 54 is rotatably mounted to the casing 52, such that the motor 57 is connected to one end of the rotary shaft 55, and the reel 54 rotates as the motor 57 rotates. One end of each of the wires 32S, 32Y, 32K is fixed to a wire fixing point 56 of the reel 54. When the reel 54 rotates clockwise in FIG. 4A, the wire 32 is wound around the reel 54, and the tension of each wire 32S, 32Y, 32K is increased. Also, when the reel 54 rotates counterclockwise in FIG. 4A, each wire 32S, 32Y, 32K is reeled out from the reel 54, and the tension of the wire 32S, 32Y, 32K is reduced. The motor 57 is connected to the controller 41 shown in FIG. 3, and rotates clockwise or counterclockwise, according to a command of the controller 41.

The tension sensor 49 detects tension applied to each wire 32S, 32Y, 32K, by a strain gauge, or the like, mounted on the wire 32S, 32Y, 32K. The tension sensor 49 may not be directly mounted on each wire 32S, 32Y, 32K, but may be mounted on a portion of the S frame 22 over which each wire 32S, 32Y, 32K is extended, for example, so that the tension of the wire 32S, 32Y, 32K can be detected by detecting deformation of the corresponding portion of the S frame 22.

The traveling condition detecting unit 42 consists of various sensors that detect traveling conditions of the vehicle. In FIG. 3, as one example, the traveling condition detecting unit 42 consists of a millimeter-wave radar 43 that detects obstacles, vehicle speed sensor 44 that detects high-speed traveling, lateral G sensor 45 that detects turning, door pressure sensor 46 that detects a collision situation of the vehicle, and accelerating and decelerating conditions, G sensor 47, and GPS device 48 that detects the traveling position of the vehicle.

Operation of Elastic Force Adjustment Unit

Figure 5:
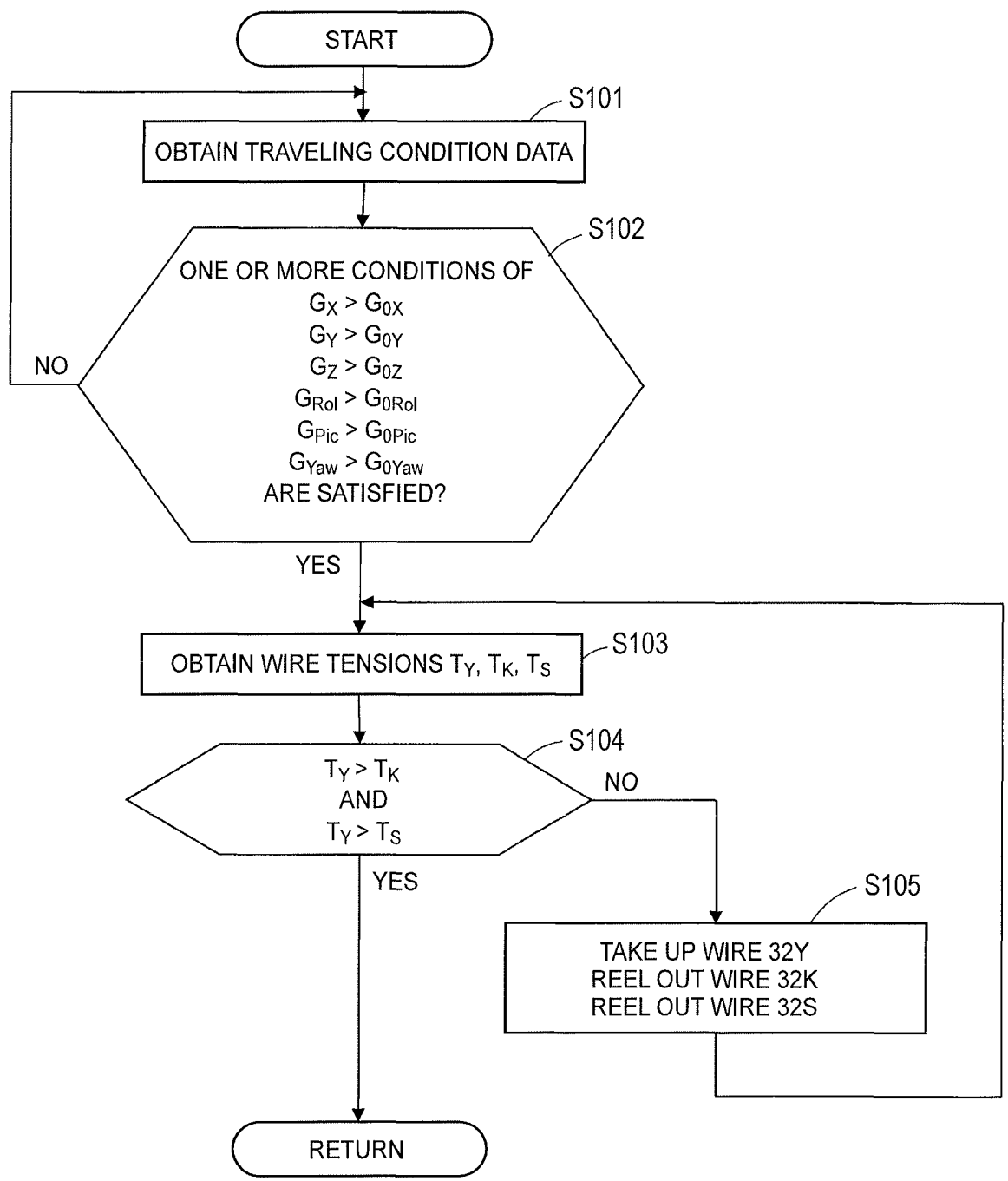
FIG. 5 is a flowchart illustrating operation of the elastic force adjustment unit of the vehicle seat shown in FIG. 1.

Referring next to FIG. 5, operation of the elastic force adjustment unit 40 of this embodiment will be described. As shown in step S101 of FIG. 5, the controller 41 obtains traveling condition data of the lateral G sensor 45, G sensor 47, etc. of the traveling condition detecting unit 42. Then, in step S102 of FIG. 5, the controller 41 calculates the acceleration $G_X$ in the longitudinal direction of the vehicle, acceleration $G_Y$ in the lateral direction, acceleration $G_Z$ in the vertical direction, acceleration $G_{Rol}$ in the roll direction, acceleration $G_{Pic}$ in the pitch direction, and acceleration $G_{Yaw}$ in the yaw direction, and determines whether each acceleration exceeds a corresponding one of acceleration limits $G_{0X}$, $G_{0Y}$, $G_{0Z}$, $G_{0Rol}$, $G_{0Pic}$, and $G_{0Yaw}$ in the respective directions. Then, when one or more accelerations exceed the corresponding one or more of the acceleration limits, namely, when any one or more conditions of $G_X > G_{0X}$, $G_Y > G_{0Y}$, $G_Z > G_{0Z}$, $G_{Rol} > G_{0Rol}$, $G_{Pic} > G_{0Pic}$, and $G_{Yaw} > G_{0Yaw}$ are satisfied, an affirmative decision (YES) is obtained in step S102 of FIG. 5. Also, when none of the above six conditions is satisfied, a negative decision (NO) is obtained in step S102 of FIG. 5. When a negative decision (NO) is obtained in step S102 of FIG. 5, the controller 41 determines that oscillation of the vehicle is not large, and returns to step S101, to repeatedly execute steps S101 and S102 of FIG. 5.

On the other hand, when an affirmative decision (YES) is obtained in step S102 of FIG. 5, the controller 41 determines that the vehicle shakes largely, during traveling on a bad road, cornering, lane change, or acceleration, for example, and proceeds to step S103 of FIG. 5. In step S102, the controller 41 is not necessarily required to refer to the accelerations, but may make the above determination, referring to map information, steering information, or accelerator pedal information. In step S103, the controller 41 obtains wire tensions $T_S$, $T_Y$, $T_K$ of the wire 32S that supports the sacrum 63 region of the occupant 60, wire 32Y that supports the lumbar spine 64 region of the occupant 60, and wire 32K that supports the thoracic spine 65 region of the occupant 60, by the respective tension sensors 49. Then, the controller 41 determines, ill step S104 of FIG. 5, whether the wire tension $T_Y$ is larger than the wire tensions $T_K$, $T_S$. When an affirmative decision (YES) is obtained in step S104 of FIG. 5, the controller 41 determines that the elastic force of the lumbar spine support 36Y of the seat back 36 is larger than those of the sacrum support 36S and thoracic spine support 36K, and finishes the routine without adjusting the tensions of the respective wires 32S, 32Y, 32K. Then, the controller 41 returns to step S101 of FIG. 5.

On the other hand, when a negative decision (NO) is obtained in step S104 of FIG. 5, the controller 41 determines that the sitting posture of the occupant 60 changes due to large oscillation of the vehicle, for example, and the elastic force of the lumbar spine support 36Y of the seat back 36 becomes smaller than the elastic force of the sacrum support 36S or thoracic spine support 36K. Then, the controller 41 proceeds to step S105 of FIG. 5, to adjust the tension of each wire 32S, 32Y, 32K.

In step S105 of FIG. 5, the controller 41 causes the take-up mechanism 51 to take up the wire 32Y extended over the middle section 34 that supports the lumbar spine 64 region of the occupant 60, so as to increase the wire tension $T_Y$ and increase the elastic force of the lumbar spine support 36Y. Also, the controller 41 causes the take-up mechanism 51 to reel out the wires 32S, 32K extended over the lower section 33 and upper section 35 that support the sacrum 63 and thoracic spine 65 regions of the occupant 60, so as to reduce the elastic forces of the sacrum support 36S and thoracic spine support 36K. Then, the controller 41 returns to step S103 of FIG. 5, to detect the respective wire tensions $T_S$, $T_Y$, $T_K$, and repeatedly executes step S103 to step S105 of FIG. 5, until it determines in step S104 of FIG. 5 that the wire tension $T_Y$ is larger than the wire tensions $T_K$, $T_S$.

Then, when an affirmative decision (YES) is obtained in step S104 of FIG. 5 the controller 41 determines that the elastic force of the lumbar spine support 36Y of the seat back 36 is larger than the elastic forces of the sacrum support 36S and thoracic spine support 36K, and finishes adjustment of the tensions of the wires 32S, 32Y, 32K. Then, the controller 41 returns to step S101 of FIG. 5.

Effect of Elastic Force Adjustment Unit

When the vehicle shakes largely, the elastic force of the lumbar spine support 36Y of the seat back 36 is made larger than those of the sacrum support 36S and thoracic spine support 36K, and the support load of the lumbar spine of the occupant 60 is made larger than those of the other regions, so that the posture of the upper body of the occupant 60 can be appropriately adjusted, and oscillation of the head 62 of the occupant 60 can be reduced, for reasons as will be described with reference to FIG. 6A to FIG. 8B. Each load distribution line 72 indicated in FIG. 6A, FIG. 7A, and FIG. 8A indicates a distribution in the vertical direction of the load applied forward (i.e., toward the front of the vehicle) from the seat back 36 to the occupant 60.

Figure 6A:
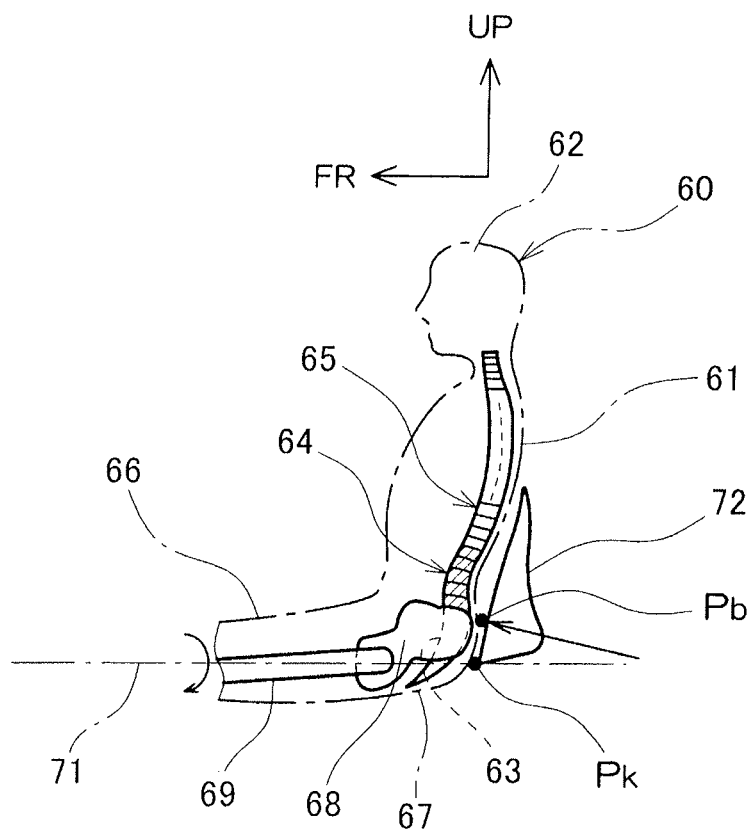
FIG. 6A is a side view showing reaction force which the occupant receives from the seat back when elastic force of a sacrum support of the vehicle seat shown in FIG. 1 is larger than those of a lumbar spine support and a thoracic spine support.
Figure 6B:
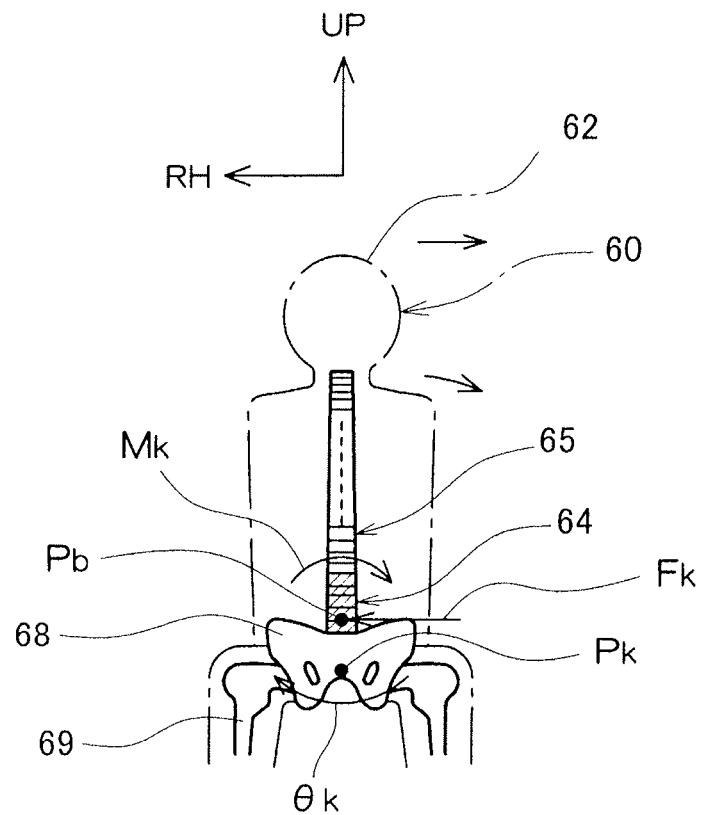
FIG. 6B is a front view showing reaction force which the occupant receives from the seat back when the elastic force of the sacrum support of the vehicle seat shown in FIG. 1 is larger than those of the lumbar spine support and thoracic spine support.

When the sitting posture of the occupant 60 changes due to large oscillation of the vehicle, for example, and the support load of the sacrum 63 region of the occupant 60 becomes larger than those of the other regions, as indicated by the load distribution line 72 in FIG. 6A, the vertical level Pb of the center position of the total reaction force applied forward from the seat back 36 to the occupant 60 becomes equal to the level of the sacrum 63, or a lower end portion of the lumbar spine 64, of the occupant 60. In this case, a pivot central axis 71 of the lower body of the occupant 60 including the pelvis 68, thighbones 69, etc. in the roll direction is represented by a line that extends in substantially the horizontal direction, passing the vicinity of the pelvis 68 of the occupant 60. Thus, the vertical level Pb of the center position of the total reaction force applied forward from the seat back 36 to the occupant 60 is higher than the vertical level Pk of the pivot central axis 71. In this case, when the lower body of the occupant 60 rotates clockwise by an angle $\theta_K$ about the pivot central axis 71, due to oscillation of the vehicle, as shown in FIG. 6B, and the upper body is apt to move toward the left side of the vehicle, the occupant 60 receives reaction force $F_K$ applied from the seat back 36 in the vehicle right-hand direction, and rotation moment $M_K$ in the clockwise direction. In the case shown in FIG. 6B, the reaction force $F_K$ acts in such a direction as to curb movement of the upper body of the occupant 60 to the left of the vehicle, but the rotation moment $M_K$ is applied in such a direction as to incline the upper body of the occupant 60 to the left of the vehicle. Therefore, the upper body of the occupant 60 is inclined to the left of the vehicle; as a result, the head 62 of the occupant 60 is likely to move leftward.

Figure 7A:
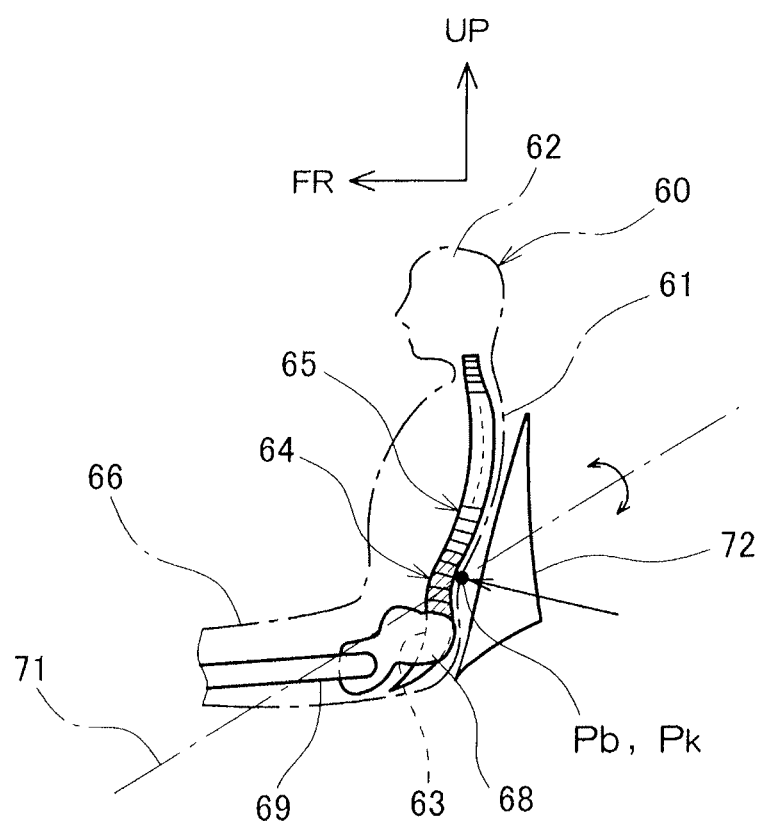
FIG. 7A is a side view showing reaction force which the occupant receives from the seat back when the elastic force of the lumbar spine support of the vehicle seat shown in FIG. 1 is larger than those of the sacrum support and thoracic spine support.
Figure 7B:
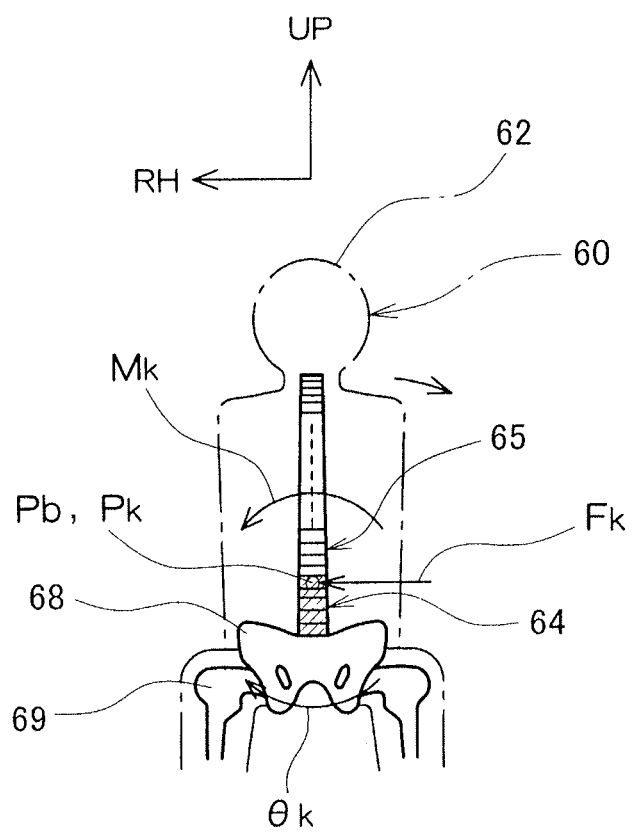
FIG. 7B is a front view showing reaction force which the occupant receives from the seat back when the elastic force of the lumbar spine support of the vehicle seat shown in FIG. 1 is larger than those of the sacrum support and thoracic spine support.

At this time, if the sitting posture of the occupant 60 is corrected by making the elastic force of the lumbar spine support 36Y of the seat back 36 larger than those of the sacrum support 36S and thoracic spine support 36K, as indicated by the load distribution line 72 in FIG. 7A, and making the support load of the lumbar spine region of the occupant 60 larger than those of the other regions, the vertical level Pb of the center position of the total reaction force applied forward from the seat back 36 to the occupant 60 becomes equal to or a little higher than a middle portion of the lumbar spine 64 of the occupant 60. In this case, the pivot central axis 71 of the lower body of the occupant 60 in the roll direction is represented by a slanting line passing the vicinity of the middle portion of the lumbar spine 64 of the occupant 60. Then, the vertical level Pb of the center position of the total reaction force applied forward from the seat back 36 to the occupant 60 becomes substantially equal to the vertical level Pk of an intersection of the pivot central axis 71 and the lumbar spine 64. In this case, when the lower body of the occupant 60 rotates clockwise by an angle $\theta_K$ about the pivot central axis 71, due to oscillation of the vehicle, as shown in FIG. 7B, and the upper body is apt to move toward the left side of the vehicle, the occupant 60 receives reaction force $F_K$ applied from the seat back 36 in the vehicle right-hand direction, and rotation moment $M_K$ in the counterclockwise direction. In the case shown in FIG. 7B, the reaction force $F_K$ acts in such a direction as to curb movement of the upper body of the occupant 60 to the left of the vehicle. Also, the rotation moment $M_K$ acts in such a direction as to curb inclination of the upper body of the occupant 60 to the left of the vehicle. Therefore, the upper body of the occupant 60 is less likely or unlikely to be inclined to the left of the vehicle, and the head 62 of the occupant 60 is less likely or unlikely to be moved.

Figure 8A:
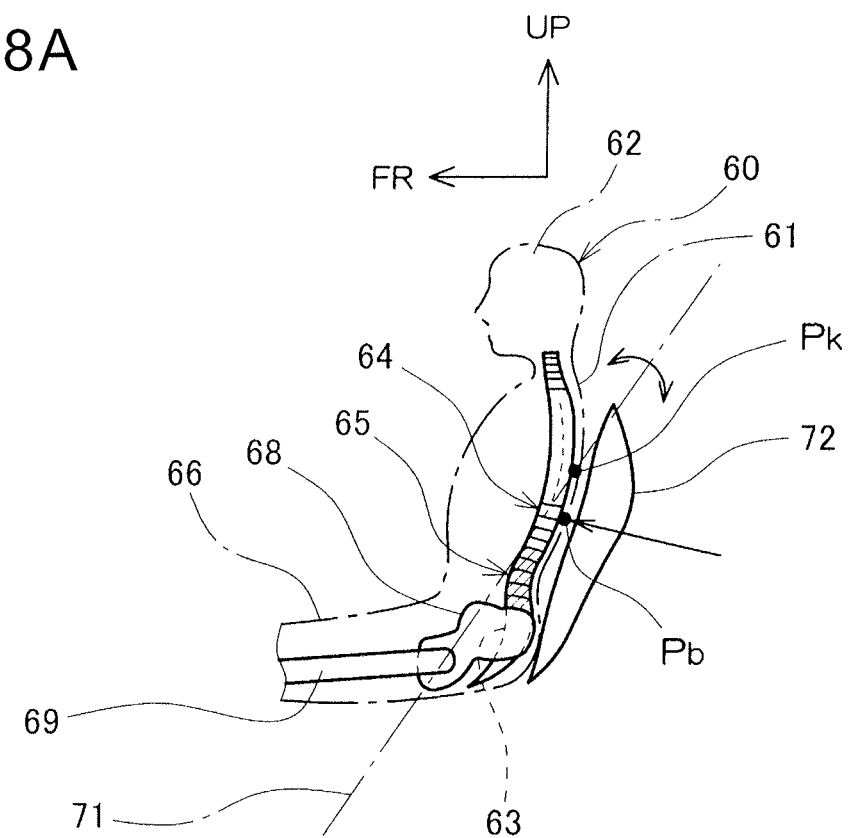
FIG. 8A is a side view showing reaction force which the occupant receives from the seat back when the elastic force of the thoracic spine support of the vehicle seat shown in FIG. 1 is larger than those of the lumbar spine support and sacrum support.
Figure 8B:
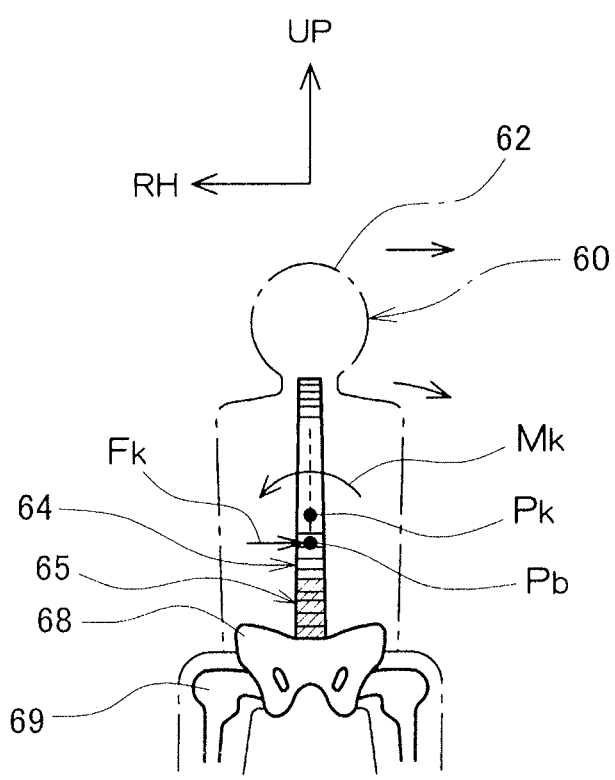
FIG. 8B is a front view showing reaction force which the occupant receives from the seat back when the elastic force of the thoracic spine support of the vehicle seat shown in FIG. 1 is larger than those of the lumbar spine support and sacrum support.

When the sitting posture of the occupant 60 changes due to large oscillation of the vehicle, for example, and the support load of the thoracic spine 65 region of the occupant 60 becomes larger than those of the other regions, as indicated by the load distribution line 72 in FIG. 8A, the vertical level Pb of the center position of the total reaction force applied forward from the seat back 36 to the occupant 60 becomes equal to or a little lower than a middle portion of the thoracic spine 65 of the occupant 60. Therefore, the pivot central axis 71 of the lower body of the occupant 60 in the roll direction is represented by a line that passes the vicinity of a middle portion of the thoracic spine 65 of the occupant 60 with a large inclination angle with respect to the horizontal direction. Then, the vertical level Pb of the center position of the total reaction force applied forward from the seat back 36 to the occupant 60 becomes lower than the vertical level Pk of an intersection of the pivot central axis 71 and the thoracic spine 65. In this case, when the lower body of the occupant 60 rotates clockwise by an angle $\theta_K$ about the pivot central axis 71, due to oscillation of the vehicle, as shown in FIG. 8B, and the upper body is apt to move toward the left side of the vehicle, the occupant 60 receives reaction force $F_K$ that moves the upper body to the left of the vehicle, and counterclockwise rotation moment $M_K$ that curbs inclination of the upper body of the occupant 60 to the left of the vehicle. Therefore, the upper body of the occupant 60 is more likely to be inclined to the left of the vehicle, and the head 62 of the occupant 60 is more likely to be moved leftward, as compared with the case as described above with reference to FIG. 7A and FIG. 7B.

For the reasons as described above, when the vehicle shakes largely, the vehicle seat 10 of this embodiment makes the elastic force of the lumbar spine support 36Y of the seat back 36 larger than those of the sacrum support 36S and thoracic spine support 36K, and makes the support load of the lumbar spine region of the occupant 60 larger than those of the other regions, so that the pelvis of the occupant 60 can be appropriately supported, and oscillation of the head 62 of the occupant 60 can be reduced or curbed.

In the vehicle seat 10 of the illustrated embodiment, the elastic forces of the sacrum support 36S, lumbar spine support 36Y, and thoracic spine support 36K can be respectively adjusted. However, the elastic force of the lumbar spine support 36Y may be made larger than those of the other portions of the seat back 36, by making it possible to adjust the elastic force of only the lumbar spine support 36Y, and making the elastic force of the lumbar spine support 36Y larger than a predetermined elastic force.

In the illustrated embodiment, each of the wires 32S, 32Y, 32K is extended over the corresponding one of the lower section 33, middle section 34, and upper section 35, such that six lines of each wire 32 are arranged in the vertical direction. However, the number of lines is not limited to six, but may be larger or smaller than six.

Two or more take-up mechanisms 51, rather than a single take-up mechanism 51, may be provided for each of the wires 32S, 32Y, 32K. Also, the take-up mechanism 51 may be provided with a latch mechanism for keeping a condition where the wire 32 is taken up or wound in the take-up mechanism 51. This makes it possible to keep the tensions of the wires 32S, 32Y, 32K even while the take-up mechanism 51 is not energized. Further, the take-up mechanism 51 may be arranged to manually take up and reel out each wire 32S, 32Y, 32K.

Each of the wires 32S, 32Y, 32K may be in the form of a resin string, or may be formed of another material provided that it can keep tension. For example, each wire 32S, 32Y, 32K may be formed from an artificial muscle containing polyvinyl chloride. In this case, the artificial muscle may be arranged to be expanded and contracted, in response to a body pressure from the occupant 60.

The tension of each wire 32S, 32Y, 32K may be controlled by predicting oscillation of the vehicle, based on various kinds of information obtained by the traveling condition detecting unit 42.

The tension sensor 49 may be replaced with a pressure sensor that detects the elastic force of the occupant 60 against the seat back 36, and the tension of each wire 32S, 32Y, 32K may be adjusted by the pressure sensor.

Second Embodiment

Figure 9:
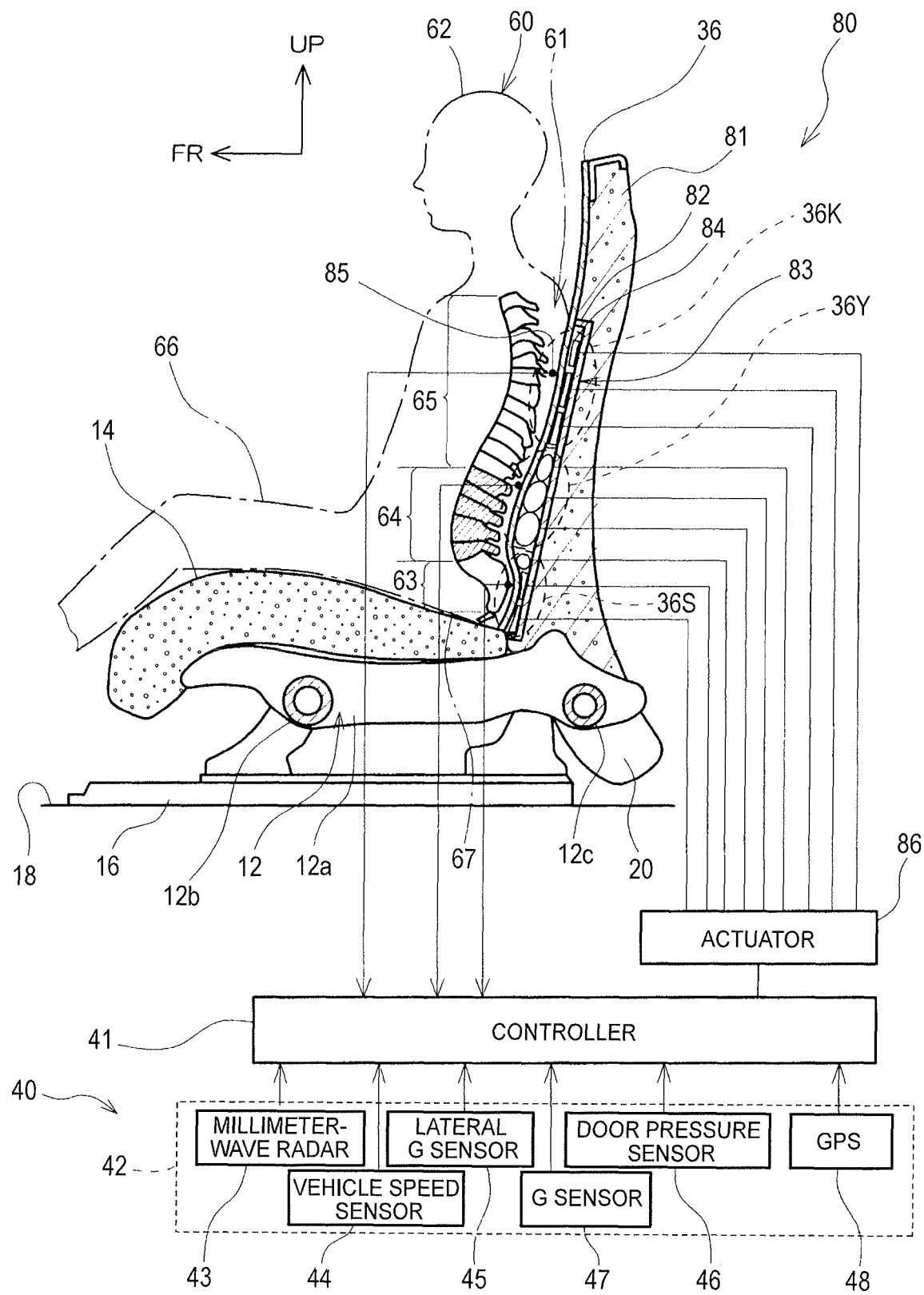
FIG. 9 is a view showing a cross-section illustrating a condition in which an occupant is seated on a vehicle seat of a second embodiment, and the configuration of an elastic force adjustment unit.

Referring next to FIG. 9, a vehicle seat 80 of a second embodiment will be described. In FIG. 9, the same reference numerals are assigned to the same components or portions as those of the vehicle seat 10 as described above with reference to FIG. 1 to FIG. 8B, and these components or portions will not be further described.

As shown in FIG. 9, the vehicle seat 80 includes a back pad 81 located on the vehicle rear side of the seat back 36 and formed of urethane, spring, or the like, and air bags 84 located between the back pad 81 and the seat back 36, in place of the load receiving wire assembly 30. The air bags 84 serve to adjust elastic forces of the sacrum 63 region, lumbar spine 64 region, and thoracic spine 65 region of the occupant 60, respectively.

As shown in FIG. 9, the air bags 84 are disposed between a partition plate 83 provided in the back pad 81, and the seat back 36. Three air bags 84 corresponding to the sacrum support 36S, lumbar spine support 36Y, and thoracic spine support 36K of the seat back 36, respectively, are arranged in the vertical direction. Each of the air bags 84 is connected to an actuator 86 that adjusts the pressure of the corresponding air bag 84. Also, pressure sensors 85 that detect elastic forces of respective regions of the occupant 60 are mounted on surfaces of the sacrum support 36S, lumbar spine support 36Y, and thoracic spine support 36K of the seat back 36. The pressure sensor 85 detects elastic force per given area, as a pressure.

The pressure sensors 85 and actuators 86 are connected to the controller 41, and the controller 41 controls the pressures of the air bags 84, based on the traveling conditions of the vehicle detected by the traveling condition detecting unit 42, and the elastic forces detected by the pressure sensors 85, so as to adjust elastic force of each of the sacrum support 36S, lumbar spine support 36Y, and thoracic spine support 36K.

Like the vehicle seat 10, when the vehicle shakes largely, the vehicle seat 80 appropriately adjusts the posture of the upper body of the occupant 60, and reduces oscillation of the head 62 of the occupant 60, by making the elastic force of the lumbar spine support 36Y of the seat back 36 larger than those of the sacrum support 36S and thoracic spine support 36K, and making the support load of the lumbar support region of the occupant 60 larger than those of the other regions.

Third Embodiment

Figure 10:
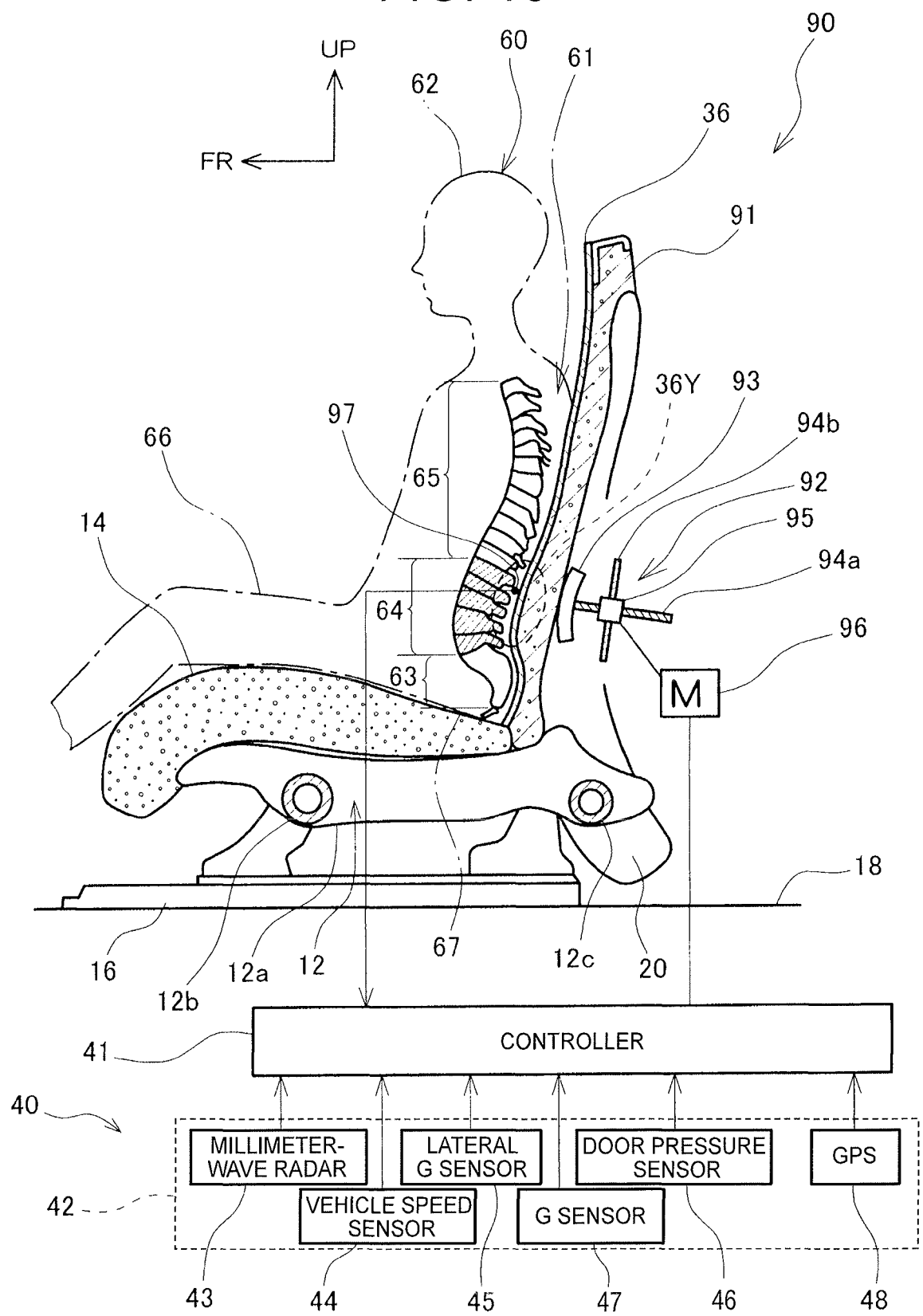
FIG. 10 is a view showing a cross-section illustrating a condition in which an occupant is seated on a vehicle seat of a third embodiment, and the configuration of an elastic force adjustment unit.

Referring next to FIG. 10, a vehicle seat 90 of a third embodiment will be described. In FIG. 10, the same reference numerals are assigned to the same components or portions as those of the vehicle seat 10 as described above with reference to FIG. 1 to FIG. 8B, and these components or portions will not be further described.

As shown in FIG. 10, the vehicle seat 90 includes a back pad 91 located on the vehicle rear side of the seat back 36 and formed of urethane, spring, or the like, in place of the load receiving wire assembly 30, and a lumbar support 92 provided on the vehicle rear side of the back pad 91 for adjusting the elastic force of the lumbar spine support 36Y. The lumbar support 92 consists of two screws 94a, 94b that extend in mutually orthogonal directions, a composite nut 95 into which the two screws 94a, 94b are screwed, and a motor 96 that drives the composite nut 95. Also, a pressure sensor 97 is mounted at a position of the seat back 36 against which the lumbar spine 64 region of the occupant 60 abuts. The pressure sensor 97 and the motor 96 are connected to the controller 41. The controller 41 adjusts the elastic force of the lumbar spine support 36Y, by driving the motor 96, based on the traveling conditions of the vehicle detected by the traveling condition detecting unit 42, and the elastic force detected by the pressure sensor 97.

When the vehicle shakes largely, the vehicle seat 90 appropriately adjusts the posture of the upper body of the occupant 60, and reduces oscillation of the head 62 of the occupant 60, by making the elastic force of the lumbar spine support 36Y of the seat back 36 larger than a predetermined elastic force, and increasing the support load of the lumbar spine region of the occupant 60.

Fourth Embodiment

Configuration of Vehicle Seat 100

Referring next to FIG. 11 to FIG. 20B, a vehicle seat 100 of a fourth embodiment will be described. In these figures, the same reference numerals are assigned to the same components or portions as those of the vehicle seat 10 as described above with reference to FIG. 1 to FIG. 8B, and these components or portions will not be further described. The vehicle seat 100 is provided by making the seat cushion 14 and seat back 36 of the vehicle seat 10 rotatable in the roll direction and yaw direction of the vehicle.

Figure 11:
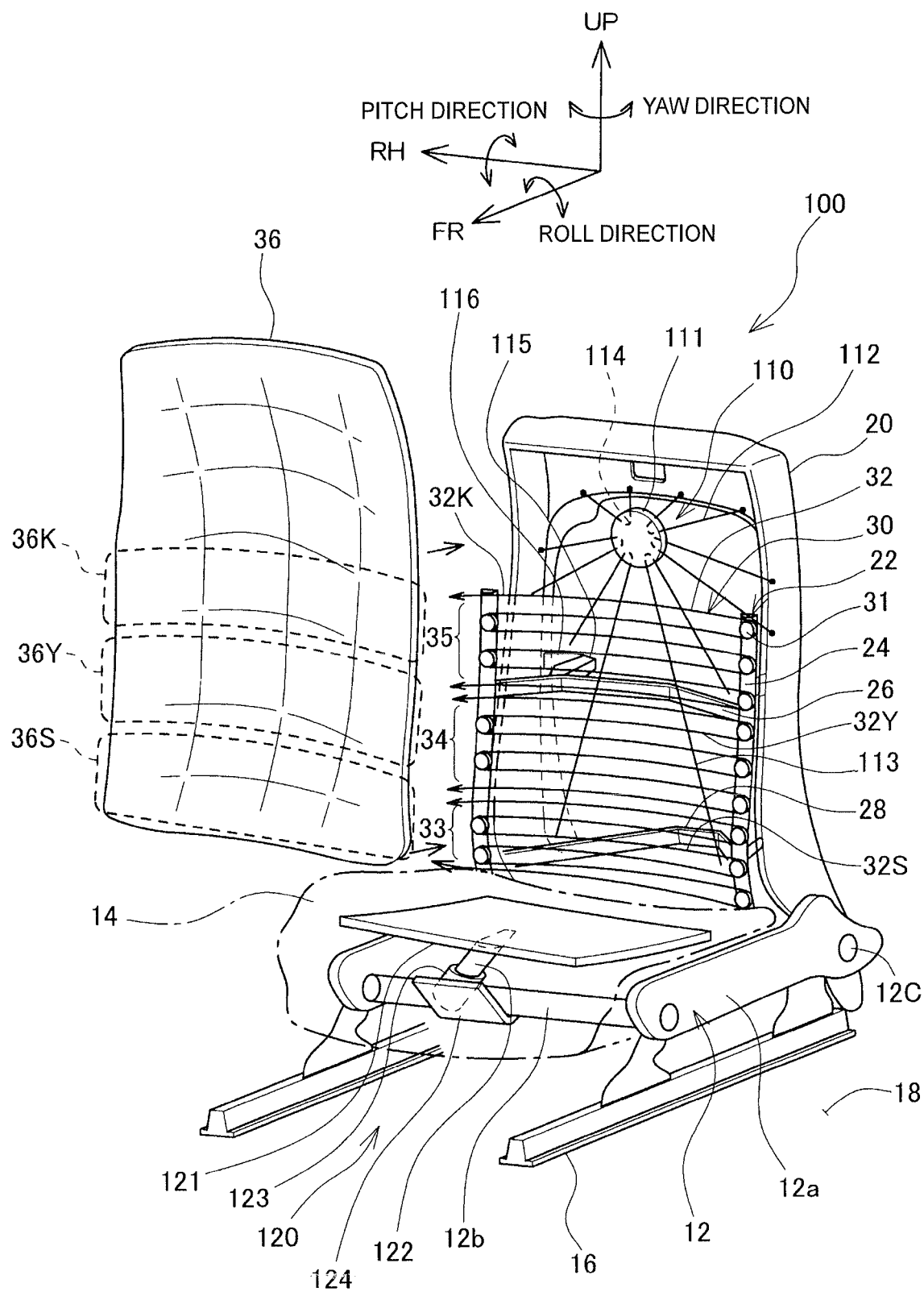
FIG. 11 is an exploded perspective view of a vehicle seat of a fourth embodiment.
Figure 13:
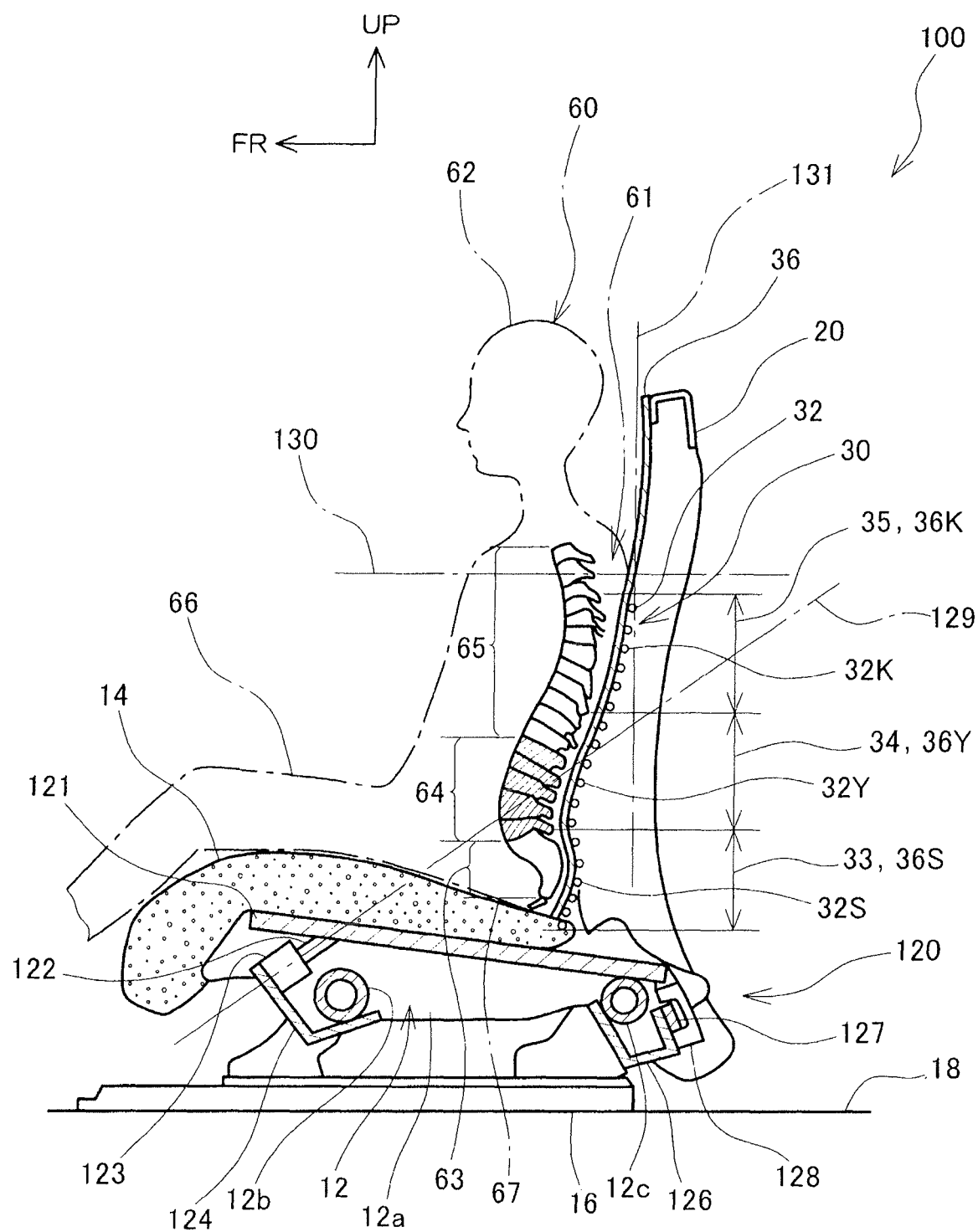
FIG. 13 is a cross-sectional view showing a condition in which an occupant is seated on the vehicle seat shown in FIG. 11.

As shown in FIG. 11 and FIG. 13, the seat cushion 14 is mounted on a cushion support 120. The cushion support 120 consists of a cushion pan 121, brackets 124, 126, bearing 123, rotary shaft 122, guide rail 127, and sliders 128. The cushion pan 121 is mounted rotatably relative to the C frame 12 in the roll direction and yaw direction of the vehicle, and the seat cushion 14 is mounted on the upper side of the cushion pan 121.

The bracket 124 having an L shape is fixed to the front pipe 12b of the C frame 12, and the bearing 123 is fixed to the bracket 124. The bearing 123 is positioned such that its pivot central axis 129 shown in FIG. 13 is inclined to be raised at the rear side in the vehicle longitudinal direction, and extends in a slanting direction passing the vicinity of a middle portion of the lumbar spine 64 of the occupant 60. The rotary shaft 122 is fixed to a lower surface of a front portion of the cushion pan 121. The rotary shaft 122 is rotatably fitted in the bearing 123.

Figure 12:
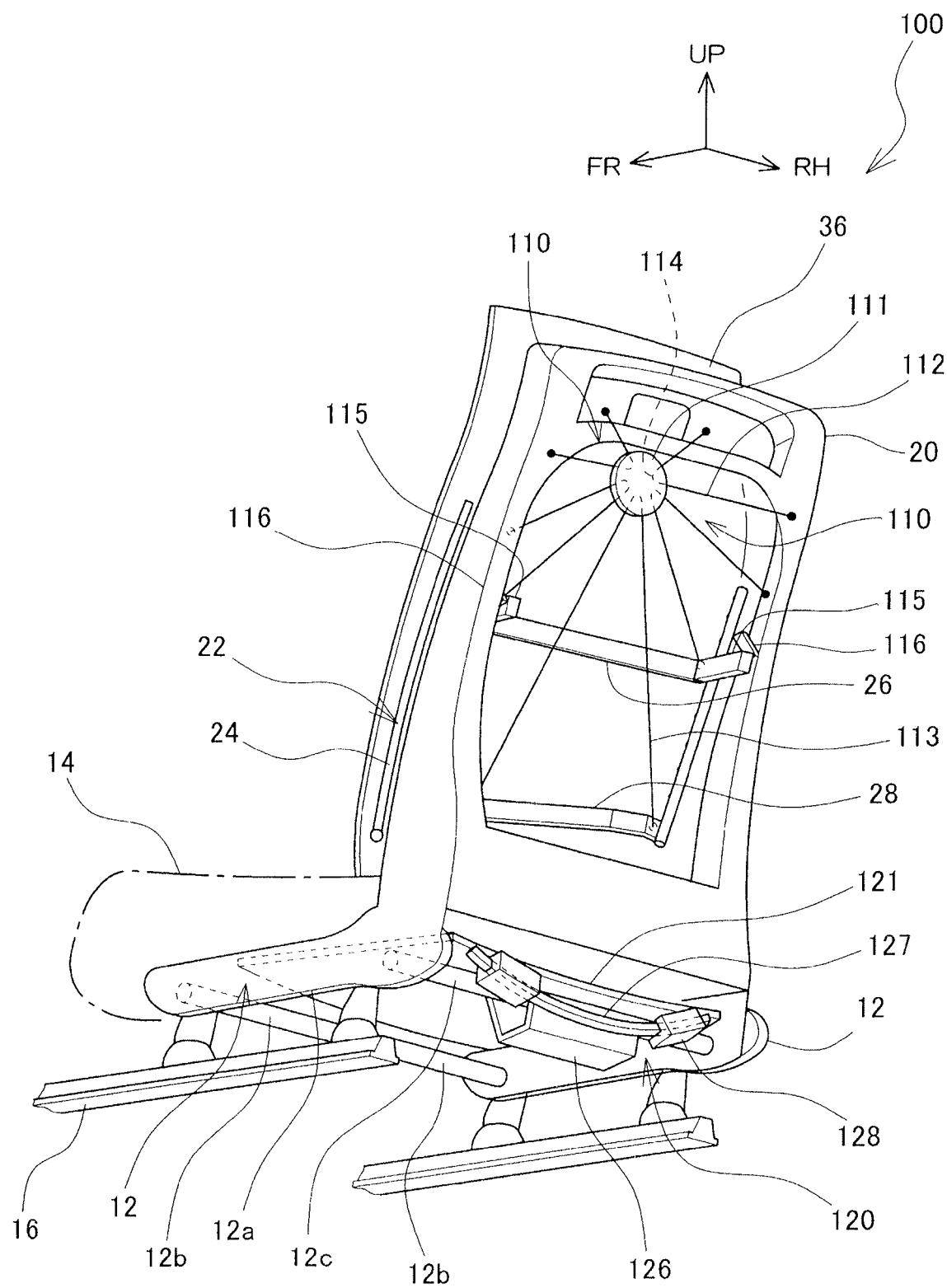
FIG. 12 is a perspective view of the vehicle seat shown in FIG. 11 as seen from the rear, lower side of the vehicle.

As shown in FIG. 12 and FIG. 13, the bracket 126 having a U shape is fixed to the rear pipe 12c of the C frame 12, and the guide rail 127 curved in an arc shape is fixed to the bracket 126. Two sliders 128 that slide in an arc-like fashion along the guide rail 127 are mounted on a lower surface of a rear portion of the cushion pan 121.

Figure 14:
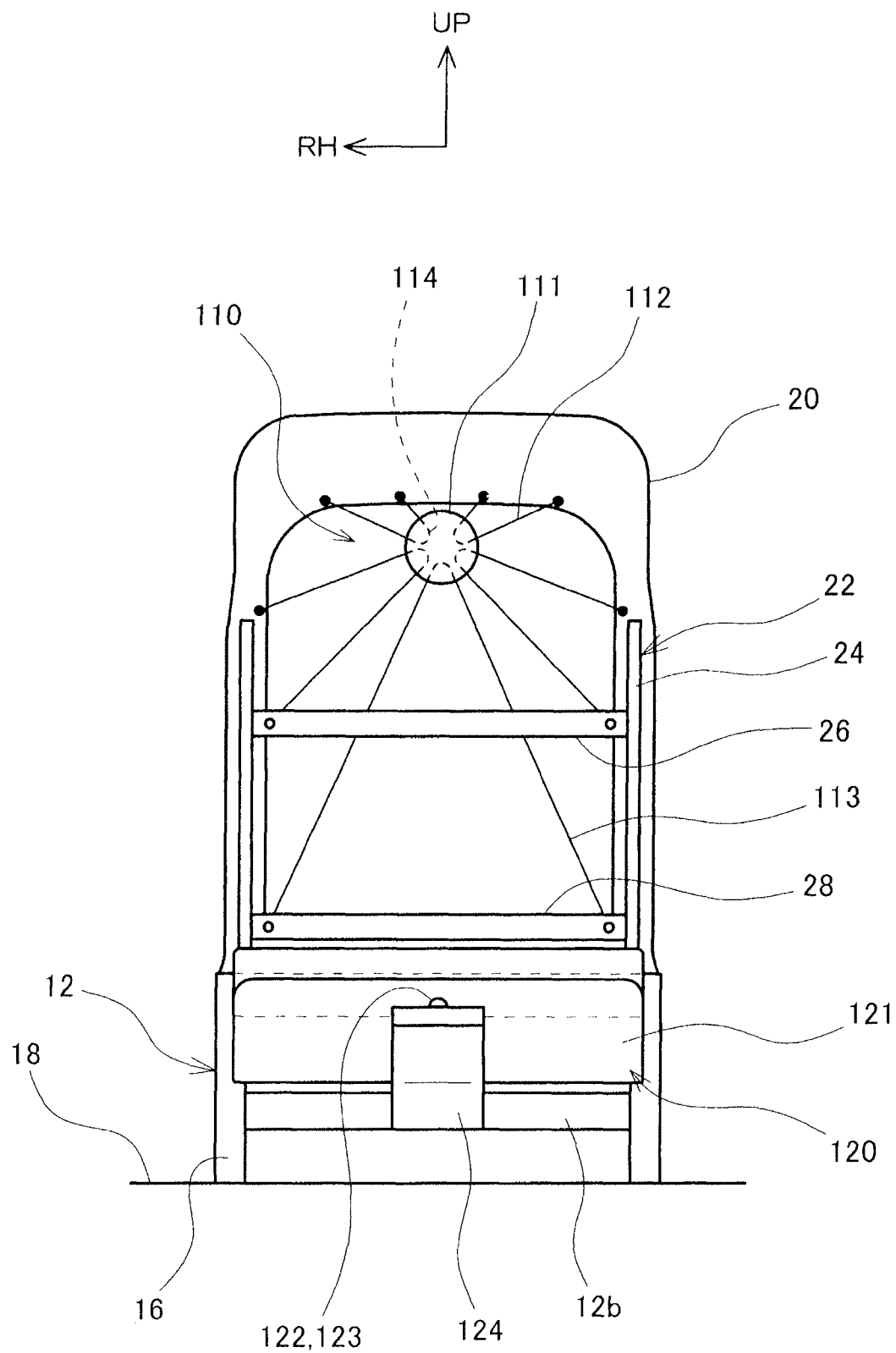
FIG. 14 is a front view of a condition in which a seat cushion and a seat back are removed from the vehicle seat shown in FIG. 11.
Figure 15:
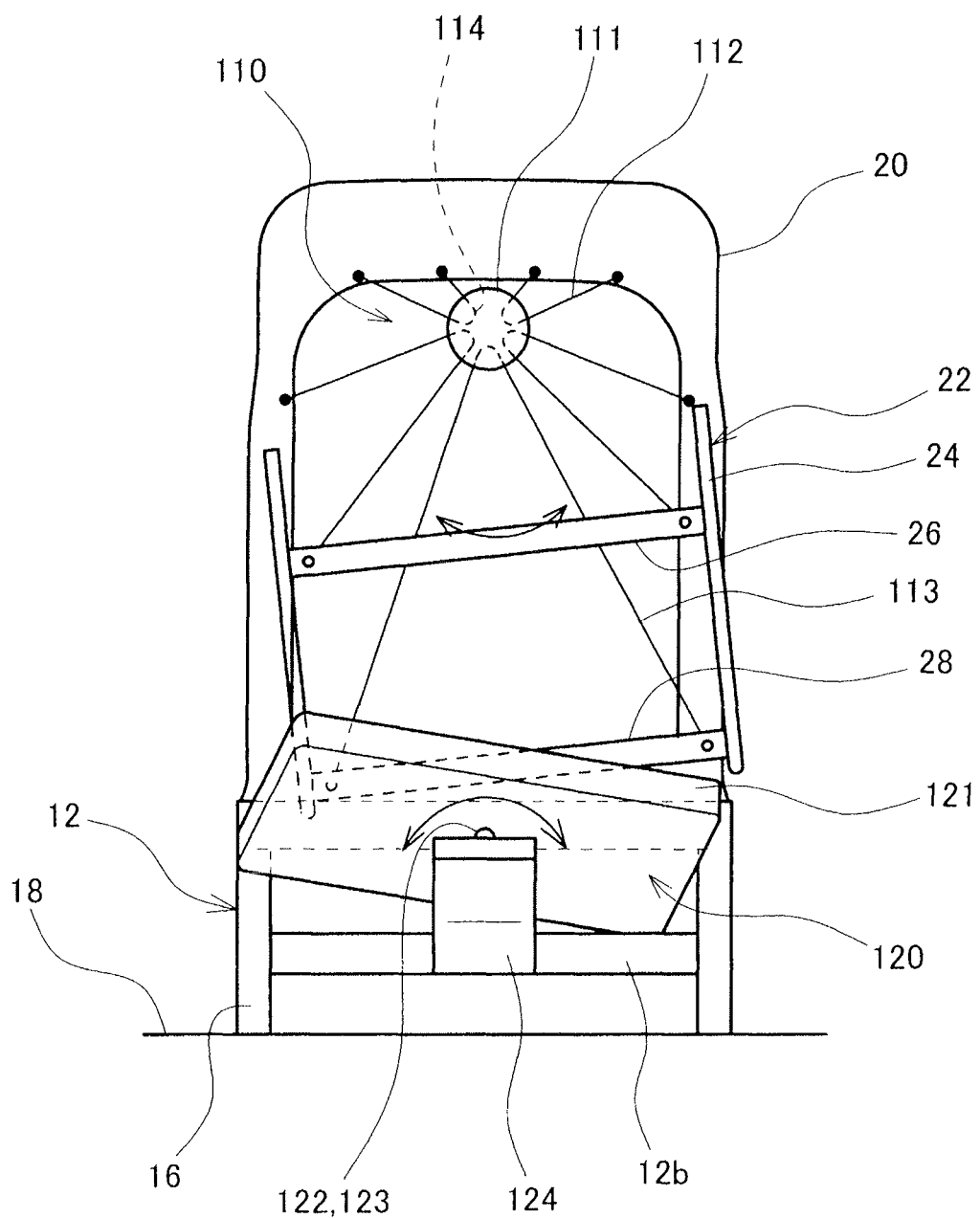
FIG. 15 is a front view corresponding to FIG. 14, showing a condition in which a seat cushion pan and a seat back sub-frame of the vehicle seat shown in FIG. 11 are rotated.

When the rotary shaft 122 of the cushion pan 121 rotates about the pivot central axis 129 of the bearing 123, the two sliders 128 move in an arc-like fashion along the guide rail 127. In this manner, the cushion pan 121 can rotate in the roll direction and yaw direction of the vehicle about the pivot central axis 129. Thus, as shown in FIG. 14 and FIG. 15, the cushion pan 121 can rotate in the roll direction and yaw direction of the vehicle relative to the C frame 12, and the seat cushion 14 mounted on the cushion pan 121 can also rotate in the roll direction and yaw direction of the vehicle relative to the C frame 12.

As shown in FIG. 11 and FIG. 12, the S frame 22 on which the seat back 36 is mounted is supported rotatably in the roll direction and yaw direction of the vehicle relative to the B frame 20. As shown in FIG. 11 and FIG. 12, brackets 115 that protrude rearward from the upper lateral member 26 are mounted to laterally opposite end portions of the upper lateral member 26 that is disposed slightly above the middle of the S frame 22 as viewed in the vertical direction and connects the opposite vertical members 24. The rear end of each of the brackets 115 is connected to the B frame 20 via a leaf spring 116. One face of one end of the leaf spring 116 is connected to the outer face (in the vehicle width direction) of a rear end portion of the bracket 115, and the other face of the other end of the leaf spring 116 is connected to the B frame 20. The leaf spring 116 is oriented such that its thickness direction corresponds to the vehicle lateral direction, and its longitudinal direction corresponds to the vehicle longitudinal direction. When the S frame 22 moves in the lateral direction relative to the B frame 20, the leaf springs 116 are flexed in the vehicle lateral direction and absorb the amount of relative movement of the S frame 22 and the B frame 20. Thus, the S frame 22 is supported laterally movably relative to the B frame 20 by the leaf springs 116.

As shown in FIG. 11 and FIG. 12, two or more wires 112 are hung between two or more mounting points of the B frame 20 via a wire through device 111. As shown in FIG. 12, the opposite ends of the wires 112 located on the right and left sides in the uppermost portion are attached to the vicinity of the laterally middle portion of the B frame 20, and two points in the upper, opposite portions. Each of the wires 112 is extended between two points in a V shape that is open in an upward oblique direction, along a U-shaped wire groove 114 provided in the wire through device 111. Thus, the wire through device 111 is hung from the B frame 20 by the upper wires 112. Similarly, the wires 112 are attached to two points on right and left vertical frame portions of the B frame 20 which extend in the vertical direction, and each of the wires 112 is extended between two points in a V shape that is open in the lateral direction, along a U-shaped wire groove 114 of the wire through device 111. Thus, the wire through device 111 is supported in the lateral direction by the right and left wires 112, against the B frame 20.

Also, as shown in FIG. 12, two or more wires 113 are hung between two or more mounting points of the S frame 22 via the wire through device 111. One end of each wire 113 is connected to the upper lateral member 26, and the other end is connected to the lower lateral member 28. The wire 113 is extended between two points in a V shape that is open in a downward oblique direction, along a U-shaped wire groove 114 provided in the wire through device 111. Thus, the wire through device 111 hangs the S frame 22 by the right and left wires 113.

As described above, the wire through device 111 is hung from the upper side of the B frame 20 by the wires 112, and is supported in the lateral direction against the B frame 20. The wire through device 111 also hangs the S frame 22 by the wires 113. Accordingly, the S frame 22 is hung from and supported by the B frame 20 via the wires 112, 113, and wire through device 111.

Thus, the S frame 22 is hung from the B frame 20 via the wires 112, 113, and wire through device 111, and is laterally movably supported by the leaf springs 116. Through the use of the wires 112, 113 and wire through device 111 and deformation of the right and left leaf springs 116, the S frame 22 can rotate in the roll direction and yaw direction of the vehicle, about a pivot central axis 130 that passes the center of the wire through device 111 and extends in the vehicle longitudinal direction as shown in FIG. 13, and a pivot central axis 131 that extends in the vertical direction. With this arrangement, as shown in FIG. 14 and FIG. 15, the S frame 22 can rotate in the roll direction and yaw direction of the vehicle relative to the B frame 20, and the seat back 36 mounted on the S frame 22 can also rotate in the roll direction and yaw direction of the vehicle relative to the B frame 20.

Operation of Vehicle Seat 100

Figure 16:
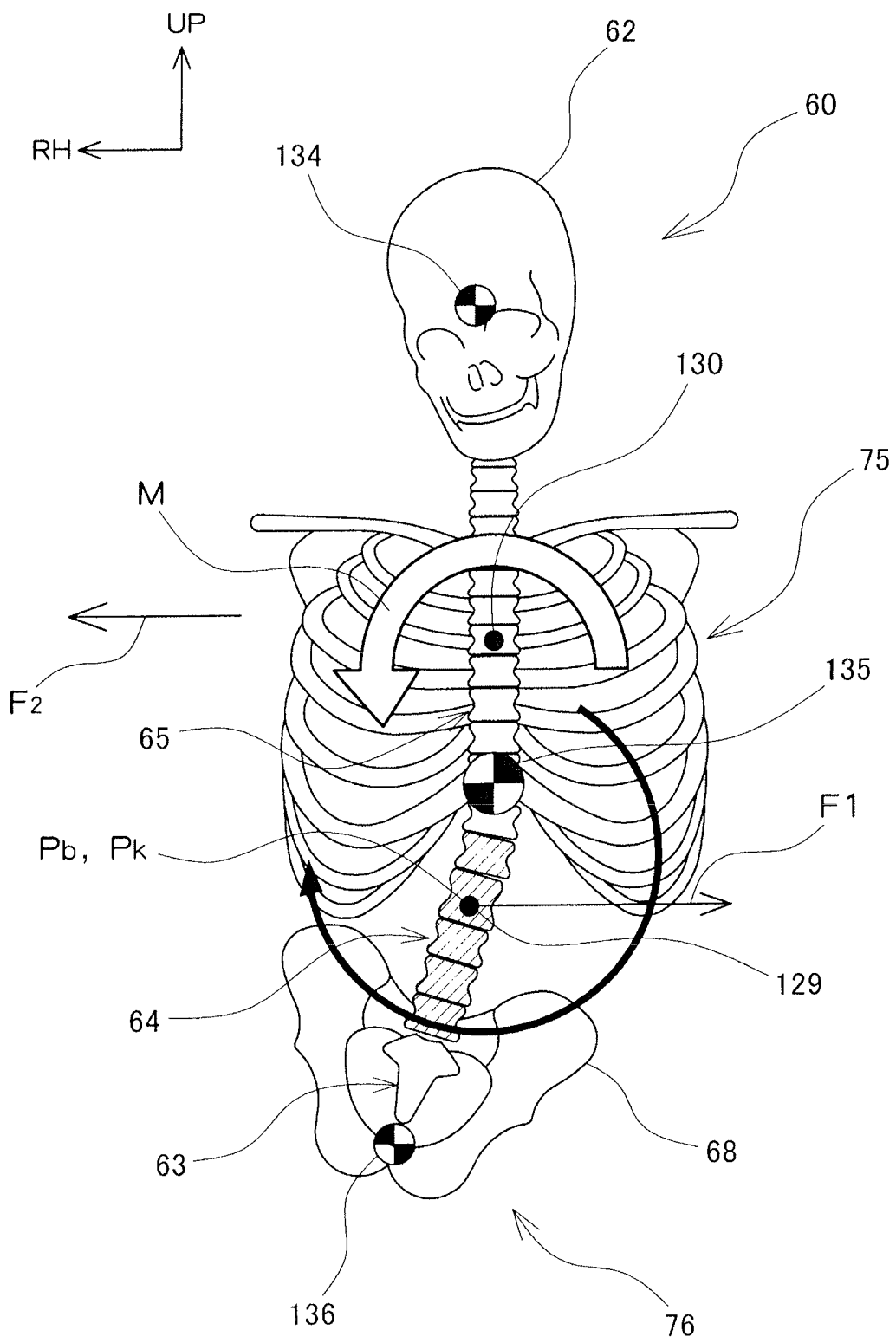
FIG. 16 is a front view showing a skeletal frame of the occupant seated on the vehicle seat shown in FIG. 11, and illustrating a condition in which force is applied to the occupant in a seat width direction.
Figure 17:
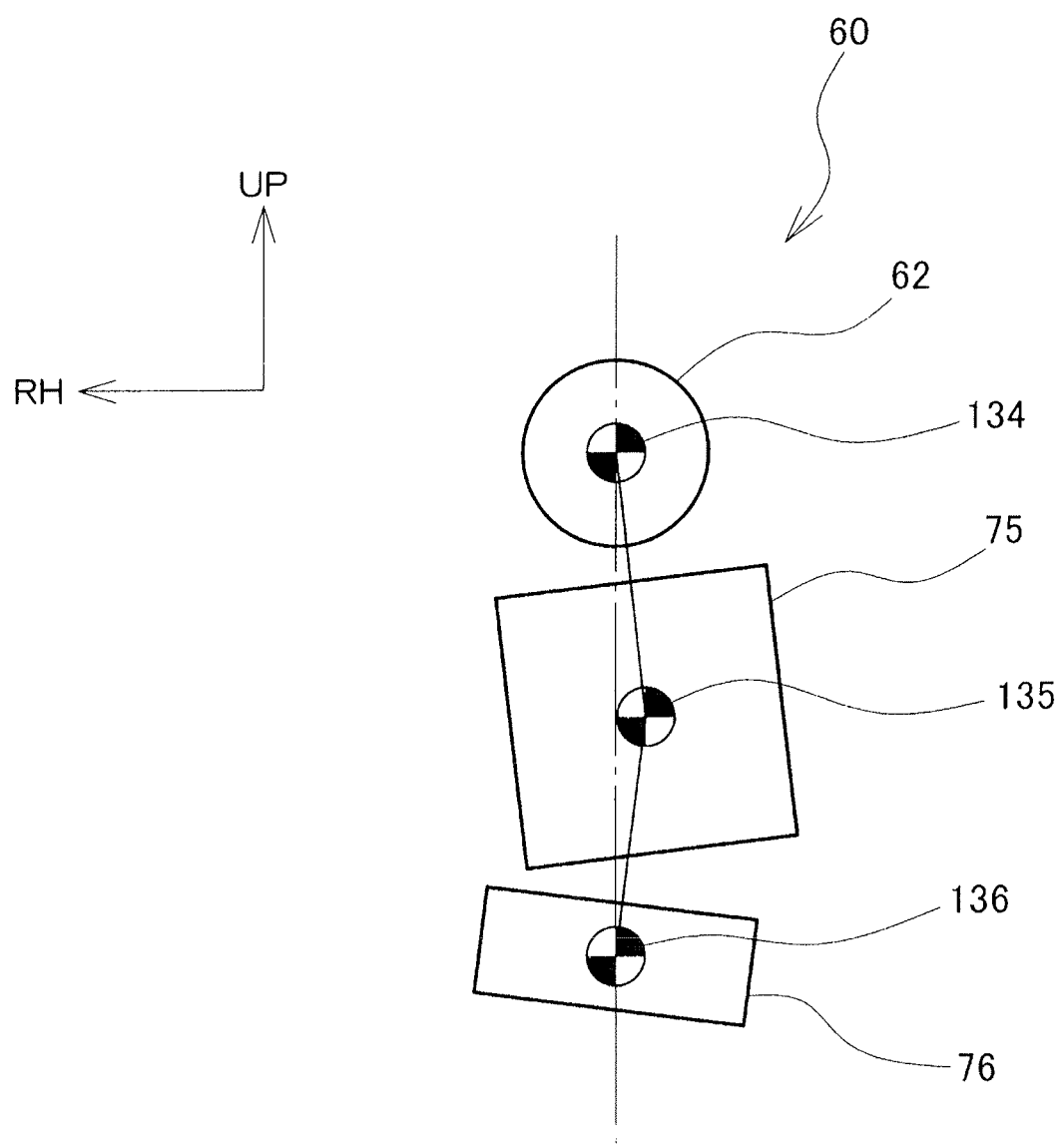
FIG. 17 is a schematic view showing a condition in which external force is applied in the seat width direction to the occupant seated on the vehicle seat shown in FIG. 11.

Referring next to FIG. 16 and FIG. 17, operation of the vehicle seat 100 will be described. In the following description, it is assumed that the vertical level Pb of the center position of the total reaction force applied toward the front of the vehicle from the seat back 36 to the occupant 60 is located in a middle portion of the lumbar spine 64 of the occupant 60 or slightly above the middle portion, as described above with reference to FIG. 7A and FIG. 7B.

The seat back 36 mounted on the S frame 22 rotates in the roll direction of the vehicle about the pivot central axis 130 shown in FIG. 13. As shown in FIG. 16, the pivot central axis 130 is set to a level at which the thoracic spine 65 of the occupant 60 is located. Accordingly, the pivot central axis 130 is located above the level Pb of the center position of the total reaction force which the occupant 60 receives from the seat back 36, and the center of gravity 135 of the upper body of the occupant 60. In FIG. 16 and FIG. 17, reference numerals 134, 136 denote the center of gravity of the head 62 and that of the lower body, respectively.

Thus, when external force F1 (which will be called "lateral force F1", see FIG. 16) is applied in the seat width direction to the upper body of the occupant 60, due to turning of the vehicle or disturbance from a road surface, for example, a moment M of force having a distance between the pivot central axis 130 and the level Pb of the center position of the total reaction force as a moment arm length is generated. With the moment M thus generated, force (frictional force) is applied between the back 61 of the occupant 60 and the seat back 36, in such a direction as to prevent the upper body of the occupant 60 from falling in the direction of application of the lateral force F1. This force is applied to the entire area of a contact portion between the back 61 of the occupant 60 and the seat back 36, and is particularly applied from a seating surface in the vicinity of the lumbar spine 64 having large elastic force to the back. As a result, the seat back 36 rotates counterclockwise about the pivot central axis 130 (see the S frame 22 of FIG. 15).

As a result, the upper body of the occupant 60 rotates or displaces counterclockwise, and the spine of the occupant 60 is curved to project in the direction of application of the lateral force F1, as shown in FIG. 17. At this time, the seat cushion 14 rotates about the pivot central axis 129 (see the cushion pan 121 of FIG. 15), and the lower half of the occupant 60 rotates clockwise. As a result, the head 62 of the occupant 60 is inclined in a direction opposite to the direction of application of the external force; therefore, the posture of the head 62 can be stabilized, due to a balance between component force in the seat width direction of the force of gravity applied to the head 62, and external force applied in the seat width direction to the head 62.

Configuration and Operation of Elastic Force Adjustment Unit

Like the vehicle seat 10, the vehicle seat 100 includes the elastic force adjustment unit 40 as shown in FIG. 3. The operation of the elastic force adjustment unit 40 has been described above with reference to FIG. 5.

Effect of Elastic Force Adjustment Unit

When the vehicle shakes largely, the elastic force adjustment unit 40 operates to make the elastic force of the lumbar spine support 36Y of the seat back 36 larger than those of the sacrum support 36S and thoracic spine support 36K, and make the support load of the lumbar spine region of the occupant 60 larger than those of the other regions, so that the posture of the upper body of the occupant 60 can be appropriately adjusted, and oscillation of the head 62 of the occupant 60 can be reduced, for reasons as described below with reference to FIG. 18A to FIG. 20B.

Figure 18A:
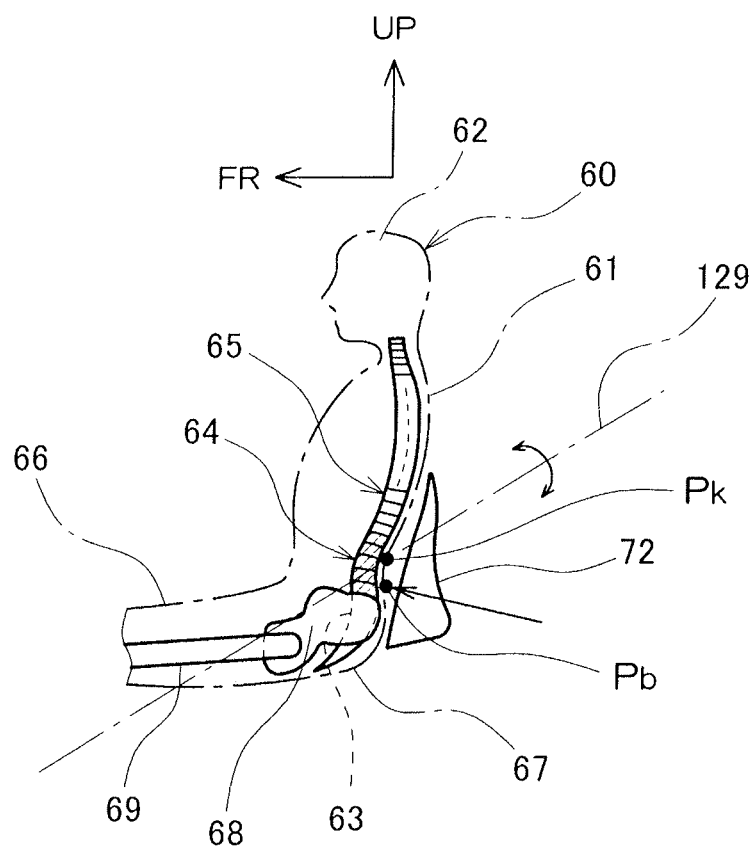
FIG. 18A is a side view showing reaction force which the occupant receives from the seat back when the elastic force of a sacrum support of the vehicle seat shown in FIG. 11 is larger than those of a lumbar spine support and a thoracic spine support.
Figure 18B:
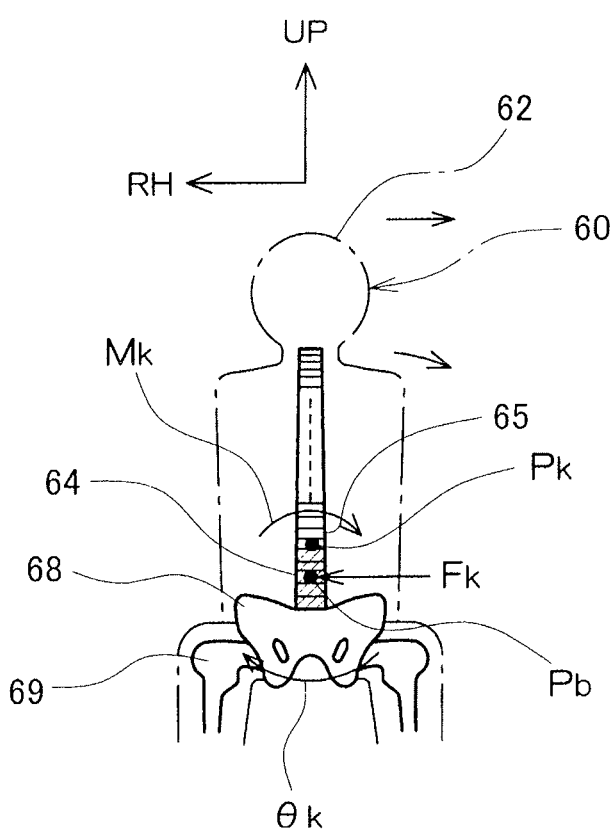
FIG. 18B is a front view showing reaction force which the occupant receives from the seat back when the elastic force of the sacrum support of the vehicle seat shown in FIG. 11 is larger than those of the lumbar spine support and thoracic spine support.

As shown in FIG. 18A, in the vehicle seat 100, the seat cushion 14 rotates in the roll direction and yaw direction of the vehicle, about the pivot central axis 129 that extends in a slanting direction passing the vicinity of the middle portion of the lumbar spine 64 of the occupant 60. When the sitting posture of the occupant 60 changes due to large oscillation of the vehicle, for example, and the support load of the sacrum 63 region of the occupant 60 becomes larger than those of the other regions, as indicated by a load distribution line 72 in FIG. 18A, the vertical level Pb of the center position of the total reaction force applied forward from the seat back 36 to the occupant 60 becomes equal to the level of the sacrum 63 of the occupant 60, or the level of the lower end portion of the lumbar spine 64. Therefore, the level Pb becomes lower than the vertical level Pk of an intersection of the pivot central axis 129 and the middle portion of the lumbar spine 64. In this case, if the lower body of the occupant 60 rotates clockwise by an angle $\theta_K$ about the pivot central axis 129, due to rotation of the seat cushion 14 as shown in FIG. 18B, and the upper body is apt to move toward the left side of the vehicle, the occupant 60 receives reaction force $F_K$ applied from the seat back 36 to the right of the vehicle, and rotation moment $M_K$ in the clockwise direction. In the case shown in FIG. 18B, the reaction force $F_K$ acts in such a direction as to curb movement of the upper body of the occupant 60 to the left of the vehicle, but the rotation moment $M_K$ is applied in such a direction as to incline the upper body of the occupant 60 to the left of the vehicle. Therefore, the upper body of the occupant 60 is inclined to the left of the vehicle; as a result, the head 62 of the occupant 60 is likely to move leftward.

Figure 19A:
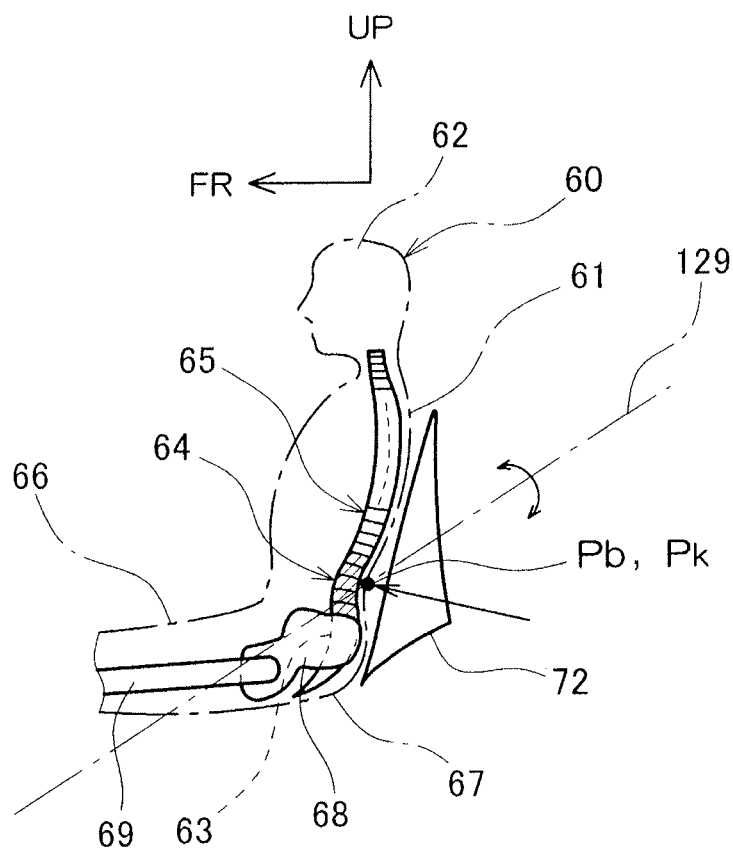
FIG. 19A is a side view showing reaction force which the occupant receives from the seat back when the elastic force of the lumbar spine support of the vehicle seat shown in FIG. 11 is larger than those of the sacrum support and thoracic spine support.
Figure 19B:
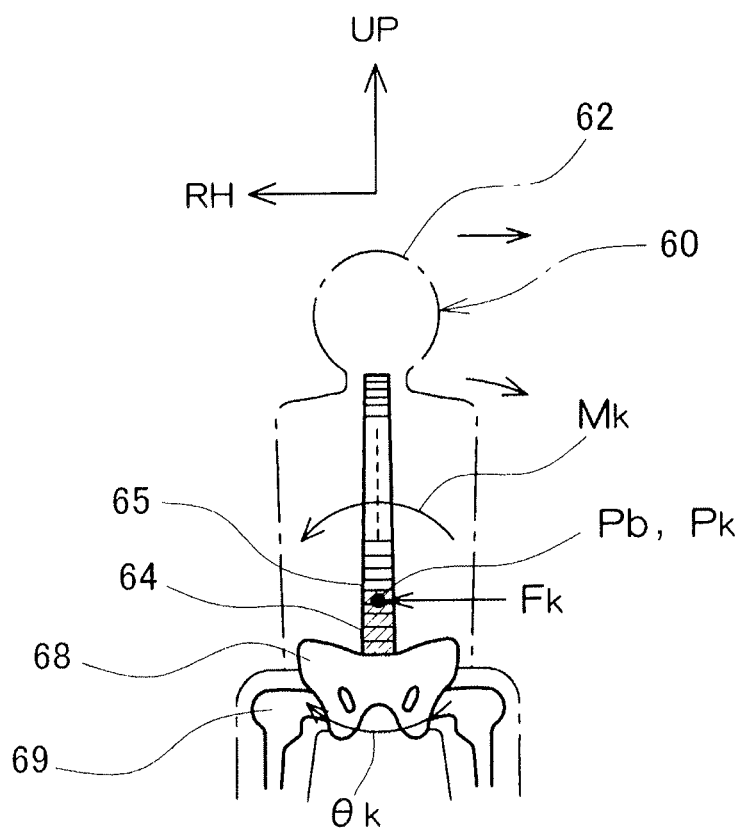
FIG. 19B is a front view showing reaction force which the occupant receives from the seat back when the elastic force of the lumbar spine support of the vehicle seat shown in FIG. 11 is larger than those of the sacrum support and thoracic spine support.

At this time, if the sitting posture of the occupant 60 is corrected, by making the elastic force of the lumbar spine support 36Y of the seat back 36 larger than those of the sacrum support 36S and thoracic spine support 36K, and making the support load of the lumbar spine region of the occupant 60 larger than those of the other regions, as indicated by the load distribution line 72 in FIG. 19A, the vertical level Pb of the center position of the total reaction force applied forward from the seat back 36 to the occupant 60 becomes equal to or a little higher than the middle portion of the lumbar spine 64 of the occupant 60. Therefore, the vertical level Pb becomes substantially equal to the vertical level Pk of the intersection of the pivot central axis 71 and the middle portion of the lumbar spine 64. In this case, if the lower body of the occupant 60 rotates clockwise by an angle $\theta_K$ about the pivot central axis 129, due to rotation of the seat cushion 14, and the upper body is apt to move to the left of the vehicle, as shown in FIG. 19B, the occupant 60 receives reaction force $F_K$ applied in the right-hand direction of the vehicle from the seat back 36, and rotation moment $M_K$ in the counterclockwise direction. In the case shown in FIG. 19B, the reaction force $F_K$ acts in such a direction as to curb movement of the upper body of the occupant 60 to the left of the vehicle. Also, the rotation moment $M_K$ acts in such a direction as to curb inclination of the upper body of the occupant 60 to the left of the vehicle. Therefore, the upper body of the occupant 60 is less likely or unlikely to be inclined leftward of the vehicle, and the head 62 of the occupant 60 is less likely or unlikely to be moved.

Figure 20A:
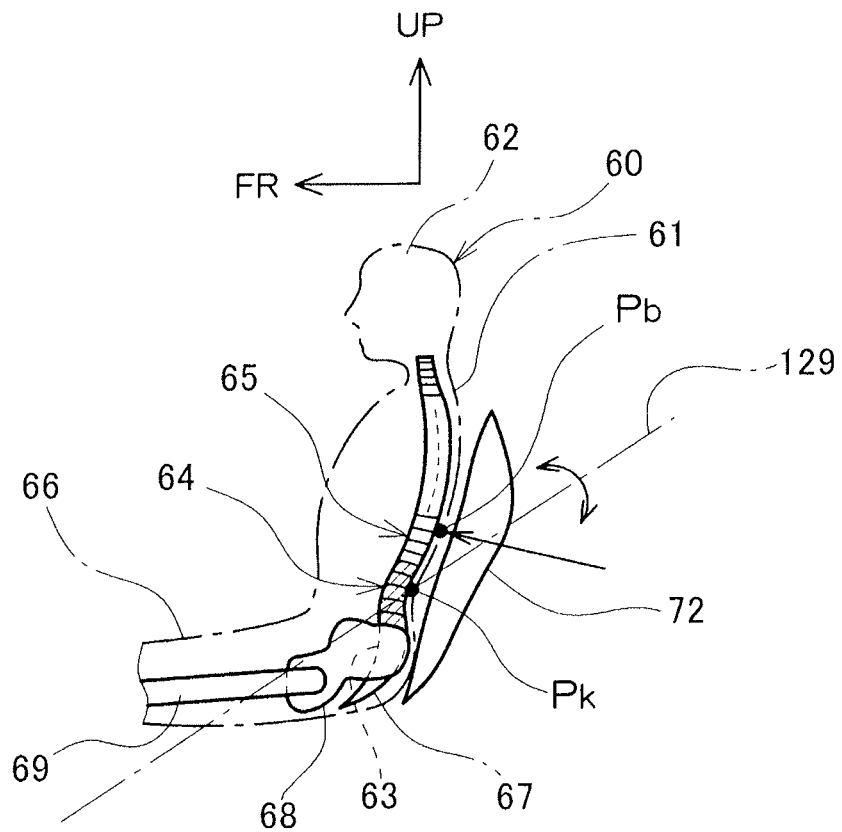
FIG. 20A is a side view showing reaction force which the occupant receives from the seat back when the elastic force of the thoracic spine support of the vehicle seat shown in FIG. 11 is larger than those of the lumbar spine support and sacrum support.
Figure 20B:
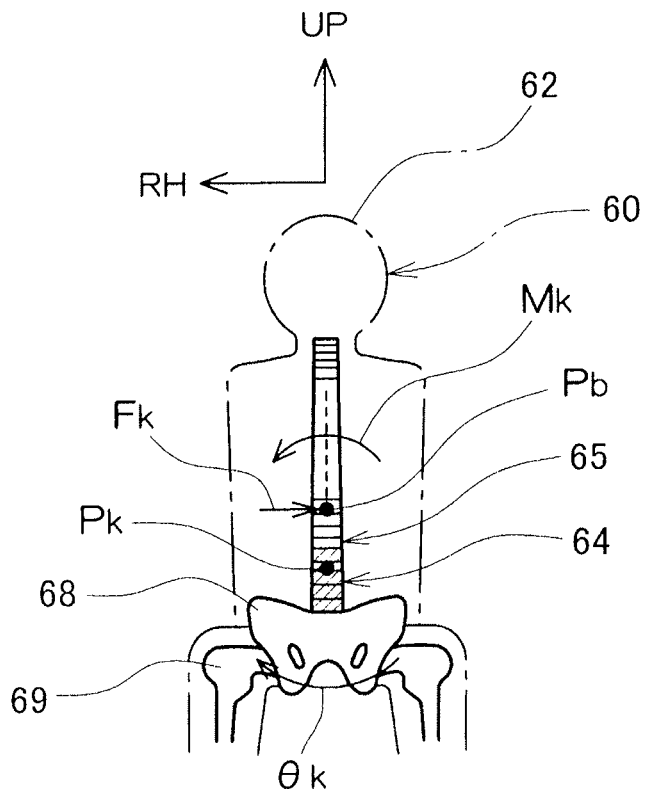
FIG. 20B is a front view showing reaction force which the occupant receives from the seat back when the elastic force of the thoracic spine support of the vehicle seat shown in FIG. 11 is larger than those of the lumbar spine support and sacrum support.

When the sitting posture of the occupant 60 changes due to large oscillation of the vehicle, for example, and the support load of the thoracic spine 65 region of the occupant 60 becomes larger than those of the other regions as shown in the load distribution line 72 in FIG. 20A, the vertical level Pb of the center position of the total reaction force applied forward from the seat back 36 to the occupant 60 becomes equal to or a little lower than the middle portion of the thoracic spine 65 of the occupant 60. Therefore, the vertical level Pb of the center position of the total reaction force applied forward from the seat back 36 to the occupant 60 becomes higher than the vertical level Pk of the intersection of the pivot central axis 129 and the lumbar spine 64. In this case, if the lower body of the occupant 60 rotates clockwise by an angle $\theta_K$ about the pivot central axis 129, due to rotation of the seat cushion 14, as shown in FIG. 20B, and the upper body is apt to move toward the left side of the vehicle, the occupant 60 receives reaction force $F_K$ that moves the upper body in the vehicle left direction, and counterclockwise rotation moment $M_K$ that curbs inclination of the upper body of the occupant 60 to the left of the vehicle, as shown in FIG. 20B. Therefore, the upper body of the occupant 60 is more likely to be inclined to the left of the vehicle, and the head 62 of the occupant 60 is more likely to be moved leftward, as compared with the case as described above with reference to FIG. 19A and FIG. 19B.

For the reasons as described above, when the vehicle shakes largely, the vehicle seat 100 of this embodiment can appropriately support the pelvis of the occupant 60, and reduce or curb oscillation of the head 62 of the occupant 60, by making the elastic force of the lumbar spine support 36Y of the seat back 36 larger than those of the sacrum support 36S and thoracic spine support 36K, and making the support load of the lumbar spine region of the occupant 60 larger than those of the other regions.

In the illustrated embodiment, the elastic force adjustment unit 40 includes the load receiving wire assembly 30 that consists of the lower section 33, middle section 34, and upper section 35, and the three tension adjustment mechanisms 50 that adjust tensions of the wires 32S, 32Y, 32K of the sections 33, 34, 35, respectively. When oscillation of the vehicle is large, the elastic force adjustment unit 40 adjusts the tensions of the wires 32S, 32Y, 32K, so that the elastic force of the lumbar spine support 36Y for the occupant 60 becomes larger than those of the sacrum support 36S and the thoracic spine support 36K. However, the elastic force adjustment unit 40 is not limited to this configuration.

Figure 21:
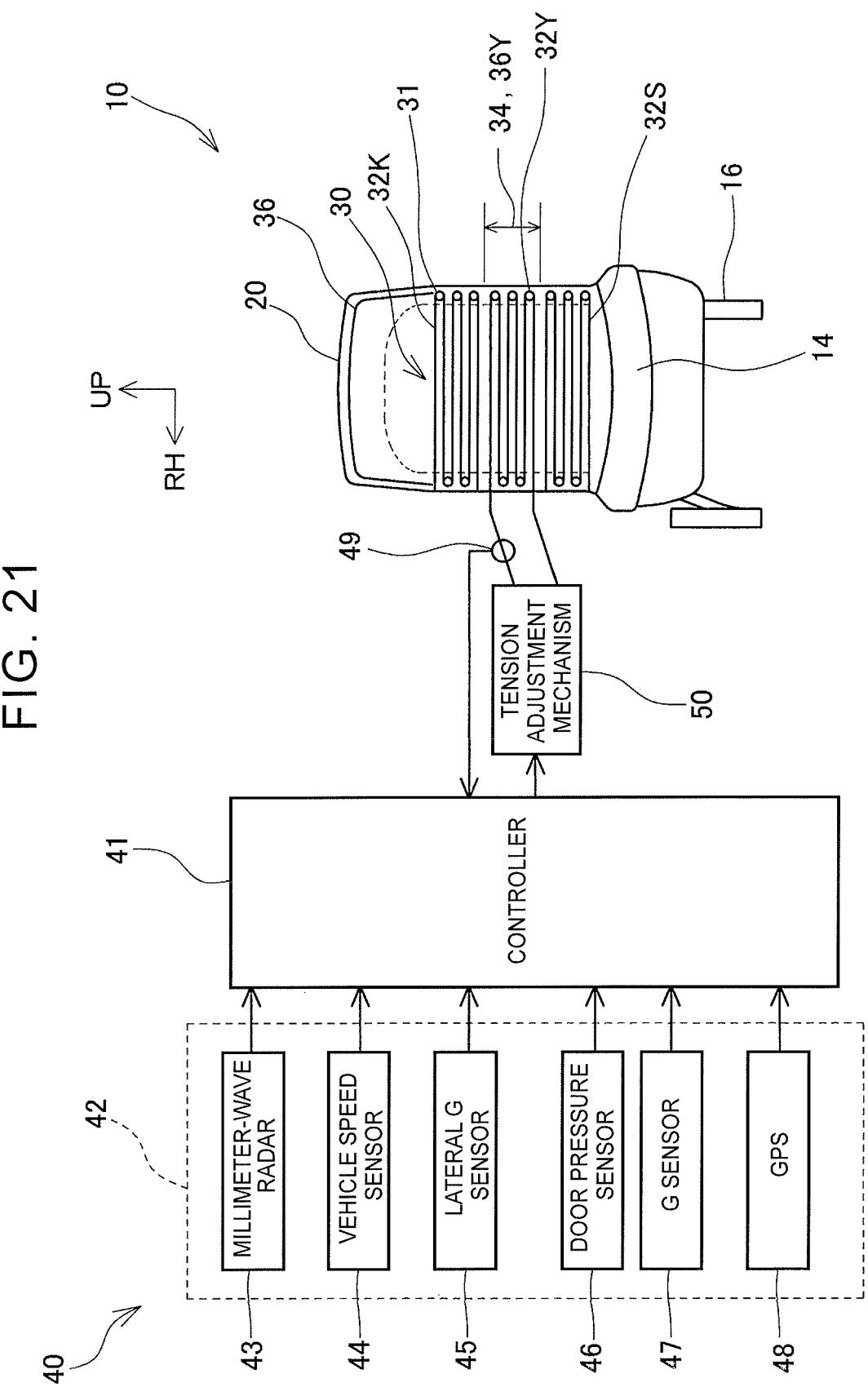
FIG. 21 is a system diagram showing the configuration of an elastic force adjustment unit of a vehicle seat of another embodiment.

For example, as shown in FIG. 21, the elastic force adjustment unit 40 may include one tension adjustment mechanism 50 that adjusts only the tension of the wire 32Y of the middle section 34, so as to adjust the elastic force of only the lumbar spine support 36Y for the occupant 60, in the longitudinal direction. The elastic force adjustment unit 40 may be configured to make the elastic force of the lumbar spine support 36Y for the occupant 60 larger in the case where oscillation of the vehicle is large, than that in the case where oscillation of the vehicle is small.

With this configuration, the controller 41 causes the tension adjustment mechanism 50 to adjust the tension of the wire 32Y in the following manner. In the following description, the same step numbers are assigned to steps that are identical with or similar to those of FIG. 5 as described above, and these steps will be briefly described.

As shown in step S101 of FIG. 22, the controller 41 obtains traveling condition data of the lateral G sensor 45, G sensor 47, etc. of the traveling condition detecting unit 42. Then, in step S102 shown in FIG. 22, the controller 41 determines that oscillation of the vehicle is large when any one or more conditions of $G_X > G_{0X}$, $G_Y > G_{0Y}$, $G_Z > G_{0Z}$, $G_{Rol} > G_{0Rol}$, $G_{Pic} > G_{0Pic}$, and $G_{Yaw} > G_{0Yaw}$ are satisfied, as in step S102 of FIG. 5 above, and proceeds to step S203 of FIG. 22. Then, the controller 41 detects the wire tension $T_Y$ of the wire 32Y in step S203, and proceeds to step S204 of FIG. 22.

In step S204 of FIG. 22, the controller 41 determines whether the wire tension $T_Y$ is larger than wire tension $T_{YNORMAL}$ of the case where oscillation of the vehicle is small. Then, when a negative decision (NO) is obtained in step S204 of FIG. 22, the controller 41 proceeds to step S205 of FIG. 22, to take up the wire 32Y. Then, the controller 41 returns to step S203 of FIG. 22, to detect the wire tension $T_Y$ of the wire 32Y. Then, when an affirmative decision (YES) is obtained in step S204 of FIG. 22, the controller 41 finishes taking up the wire 32Y. Thus, the controller 41 increases the tension of the wire 32Y, until an affirmative decision (YES) is obtained in step S204 of FIG. 22. Then, when the wire tension $T_Y$ becomes larger than the wire tension $T_{YNORMAL}$, the controller 41 determines that the elastic force of the lumbar spine support 36Y in the longitudinal direction becomes larger than that in the case where oscillation of the vehicle is small, and finishes adjustment of the wire 32Y.

According to this embodiment, when oscillation of the vehicle is large, the elastic force of only the lumbar spine support 36Y of the seat back 36 in the longitudinal direction can be made larger than that in the case where oscillation of the vehicle is small. Thus, it is possible to appropriately hold the pelvis of the occupant 60, and reduce oscillation of the head 62, when oscillation of the vehicle is large.

In the embodiments described above with reference to FIG. 1 to FIG. 8B, and FIG. 1I to FIG. 20B, only the wire tension $T_Y$ of the wire 32Y may be adjusted, and the elastic force of the lumbar spine support 36Y in the longitudinal direction when oscillation of the vehicle is large may be made larger than that in the case where oscillation of the vehicle is small, as in the embodiment described with reference to FIG. 21 and FIG. 22.

What is claimed is:

1. A vehicle seat comprising:
   a seat cushion configured to support buttocks of an occupant;
   a seat back configured to support a back of the occupant, the seat back including a lumbar spine support configured to support a lumbar spine of the occupant;
   an elastic force adjustment unit configured to adjust elastic force of the lumbar spine support in a longitudinal direction; and
   a controller configured to operate the elastic force adjustment unit, the controller being configured to cause the elastic force adjustment unit to make the elastic force larger in a case where oscillation of a vehicle is large, than that in a case where oscillation of the vehicle is small.

2. The vehicle seat according to claim 1, wherein:
   the elastic force adjustment unit is configured to adjust the elastic force of only the lumbar spine support in the longitudinal direction; and
   the controller is configured to cause the elastic force adjustment unit to make the elastic force of only the lumbar spine support larger in the case where oscillation of the vehicle is large, than that in the case where oscillation of the vehicle is small.

3. The vehicle seat according to claim 1, wherein the elastic force adjustment unit is configured to make the elastic force of the lumbar spine support larger than elastic force of a portion of the seat back other than the lumbar spine support.

4. The vehicle seat according to claim 3, wherein:
   the elastic force adjustment unit is configured to adjust elastic force of a sacrum support included in the seat back and the sacrum support configured to support a sacrum located below the lumbar spine of the occupant, and elastic force of a thoracic spine support included in the seat back and the thoracic spine support configured to support a thoracic spine located above the lumbar spine of the occupant, in addition to the elastic force of the lumbar spine support; and
   the elastic force adjustment unit is configured to make the elastic force of the lumbar spine support larger than the elastic force of each of the sacrum support and the thoracic spine support, when oscillation of the vehicle is large.

5. The vehicle seat according to claim 1, wherein:
   the case where oscillation of the vehicle is large includes at least one case selected from traveling on a bad road, cornering, lane change, and acceleration; and
   the controller is configured to make the elastic force of the lumbar spine support larger than elastic force of a portion of the seat back other than the lumbar spine support, in at least one case selected from traveling on a bad road, cornering, lane change, and acceleration.

6. The vehicle seat according to claim 1, wherein:
   the elastic force adjustment unit includes a wire extended in a width direction of the seat back, and a tension adjustment mechanism configured to adjust tension of the wire; and
   the elastic force adjustment unit is configured to change the elastic force by causing the tension adjustment mechanism to adjust the tension of the wire.

7. The vehicle seat according to claim 1, wherein the seat back is configured to rotate relative to the seat cushion.

8. The vehicle seat according to claim 1, further comprising a frame that is mounted on the vehicle and supports the seat cushion and the seat back, wherein the seat cushion is configured to pivot in a roll direction and a yaw direction of the vehicle relative to the frame, and is configured to support the buttocks and thighs of the occupant;

the seat back is configured to pivot in the roll direction and the yaw direction of the vehicle relative to the frame; and a pivot center axis of the seat cushion passes the lumbar spine support of the seat back.

\* \* \* \* \*